| A | B | C | D |
|---|---|---|---|
| Debit | Credit | Old Bal. | New Bal. |
|  | 135.25 | 20.10 | 115.15 * |
| 525.32 |  | 115.15 | 410.17 * |
|  |  |  |  |
|  |  |  |  |
|  |  |  |  |
|  |  |  |  |

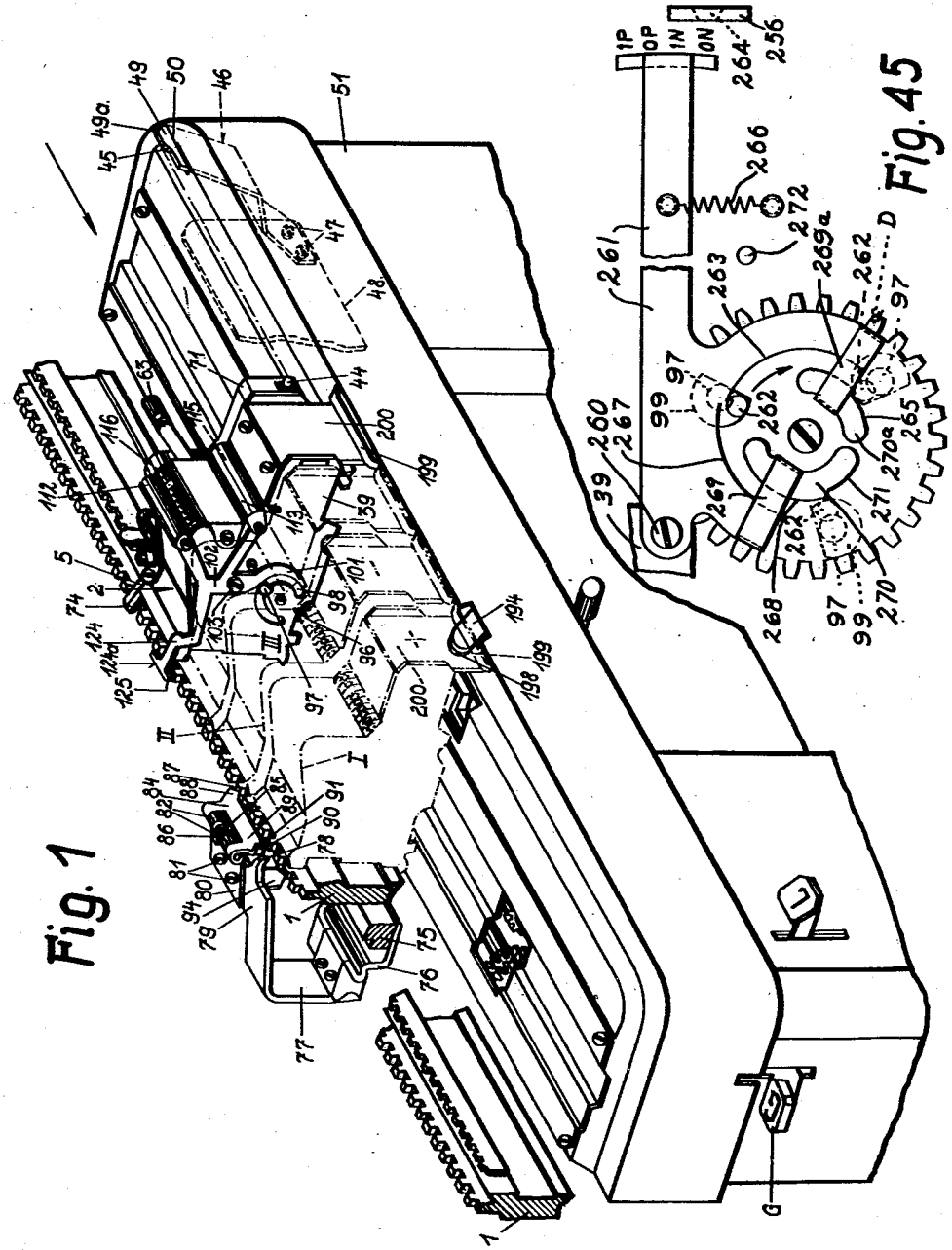

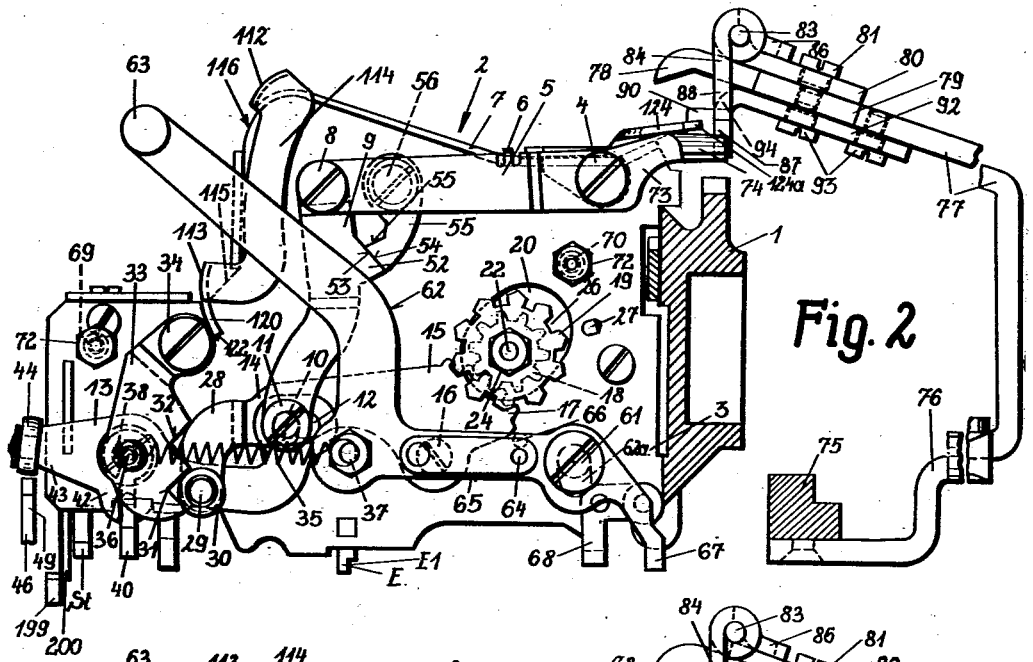

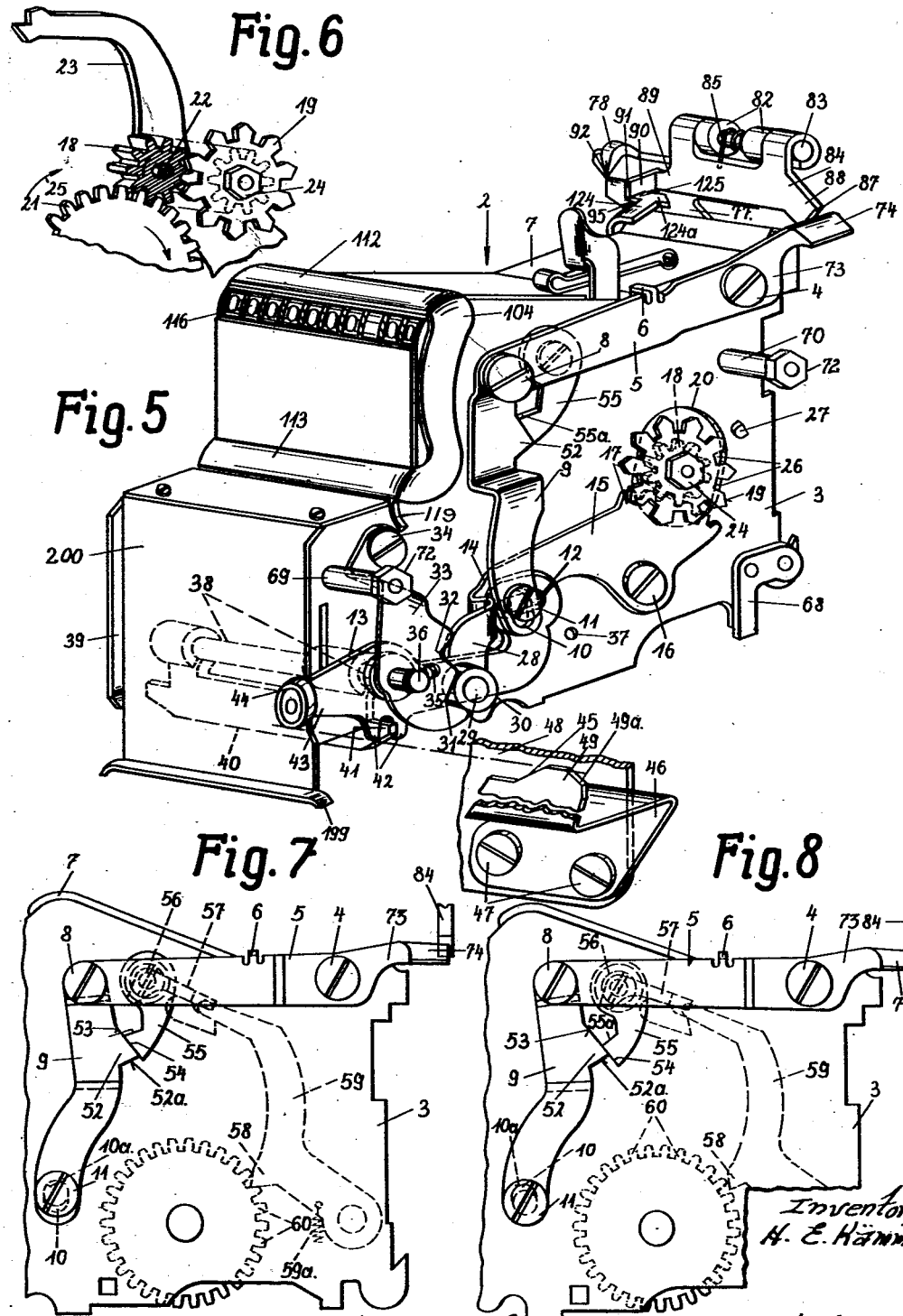

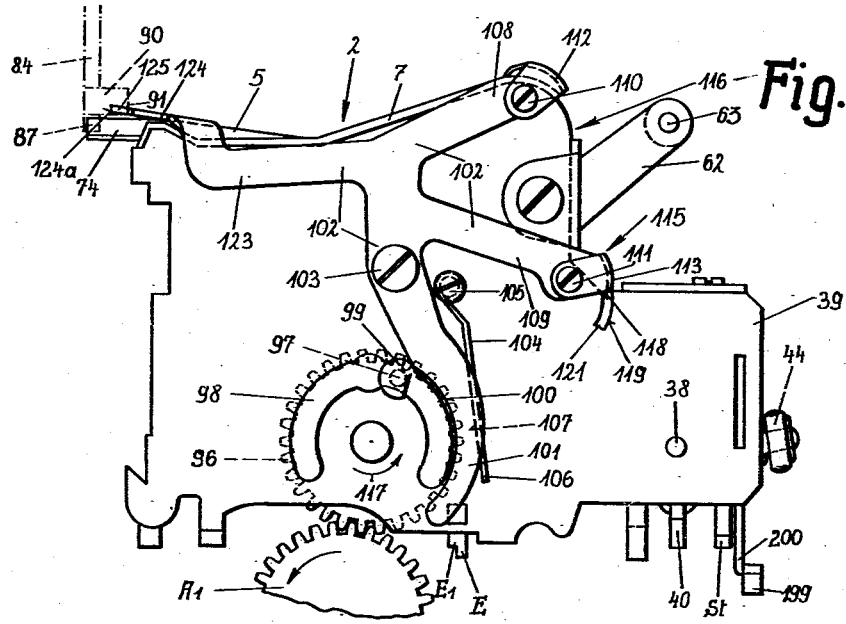
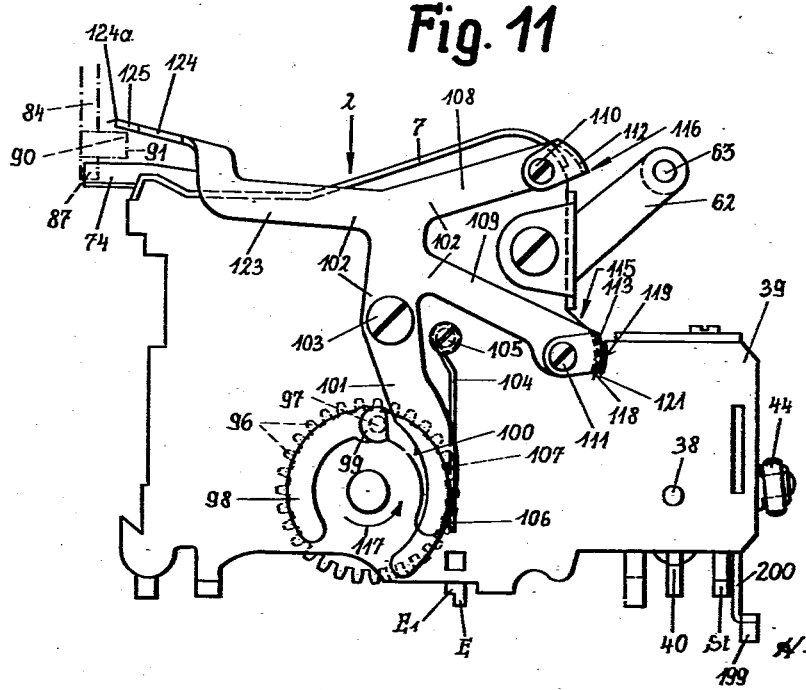

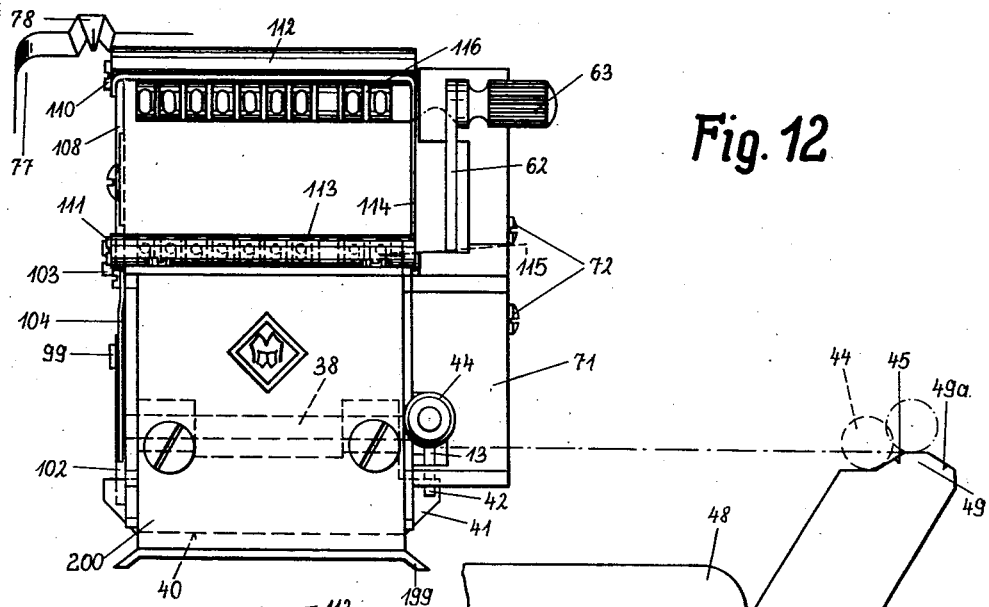
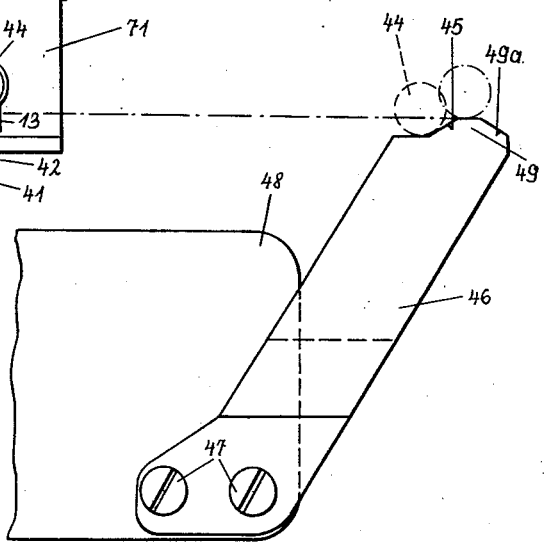
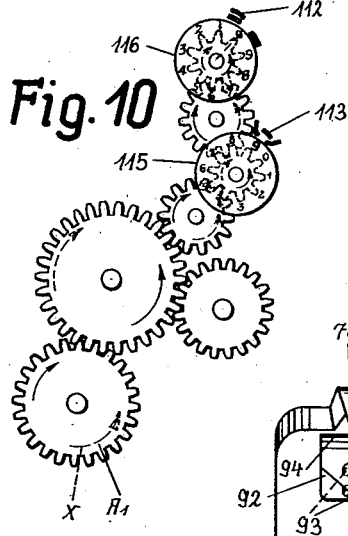
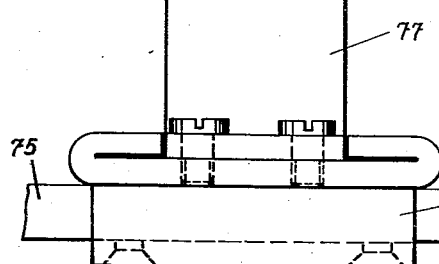
Fig. 12
Fig. 10
Fig. 13

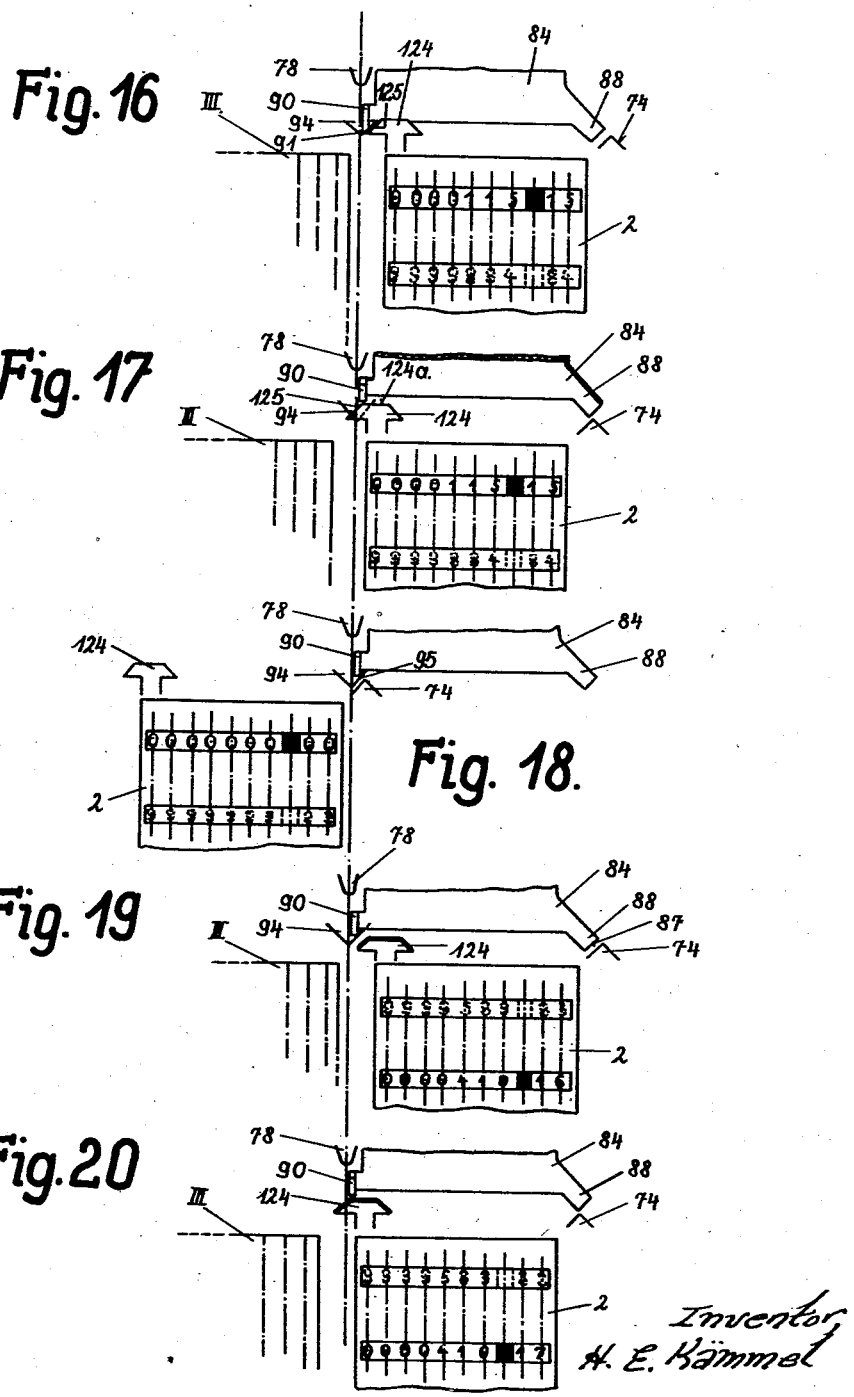

Nov. 28, 1944. H. E. KÄMMEL 2,364,025
COMPLEMENTARY TOTALIZER
Filed Feb. 28, 1939  16 Sheets-Sheet 8
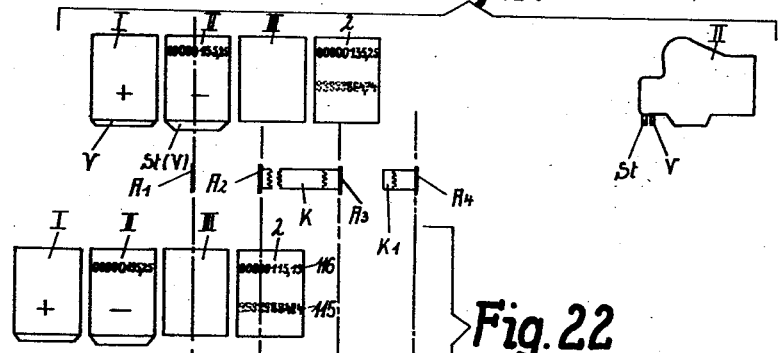
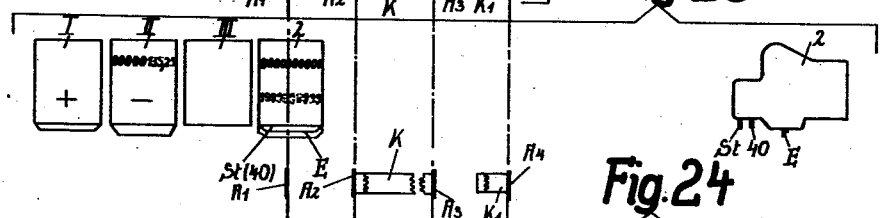
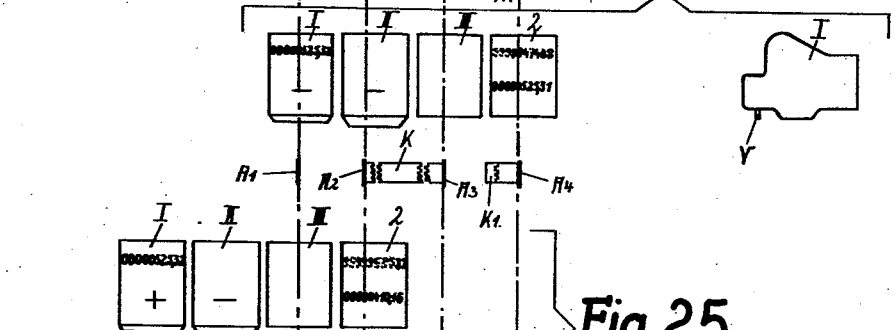
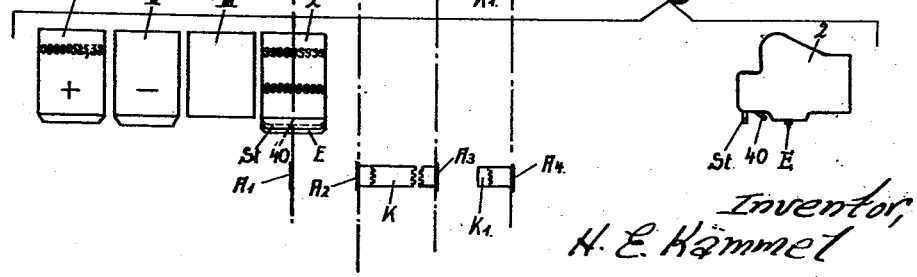
Inventor,
H. E. Kämmel

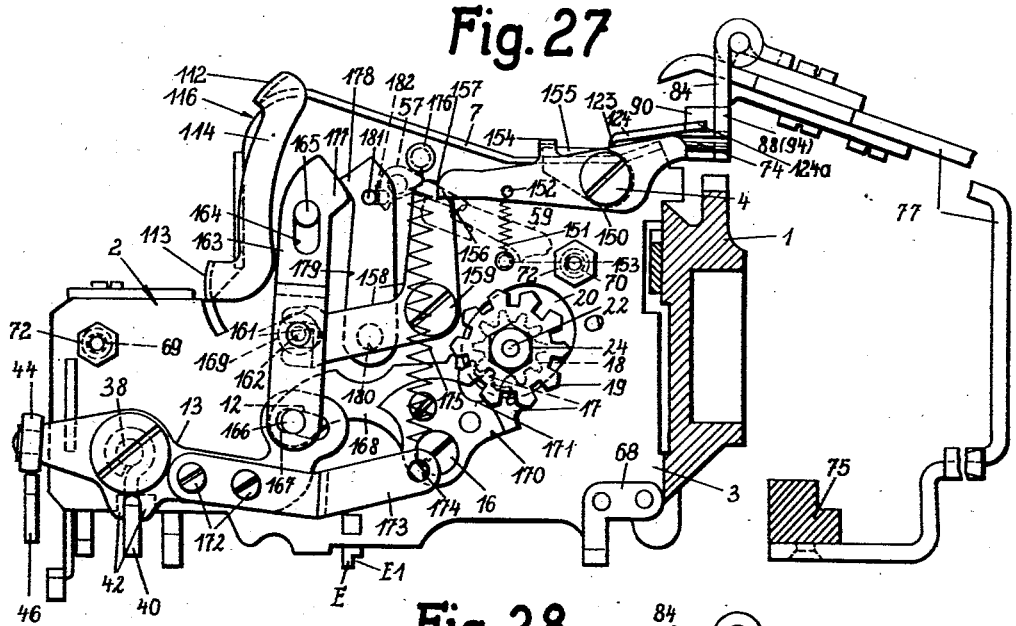
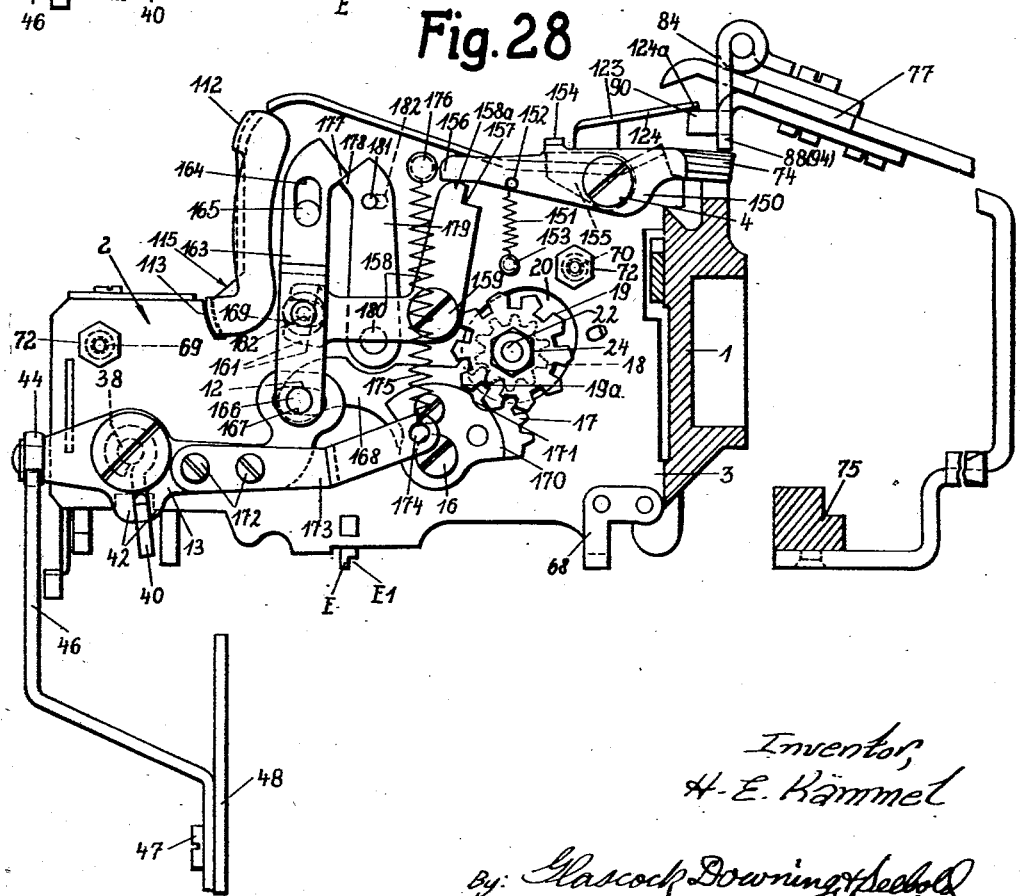

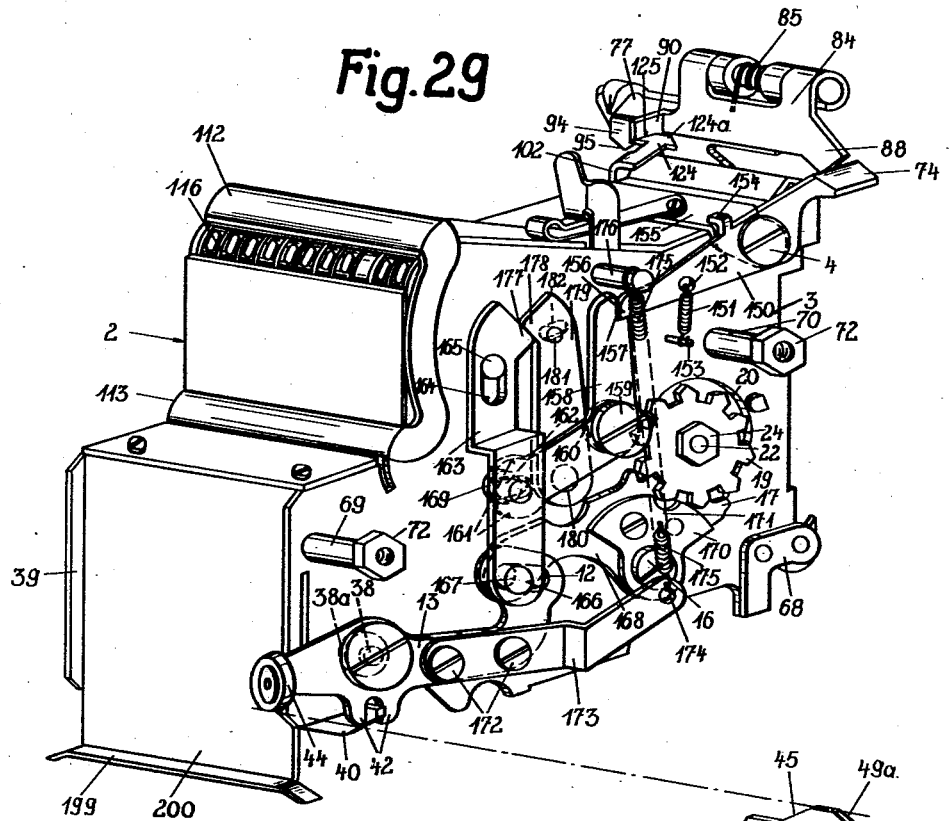
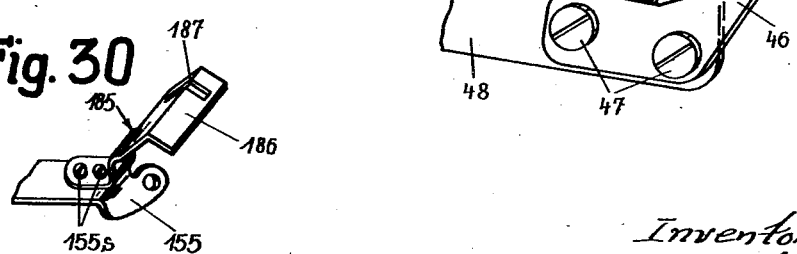

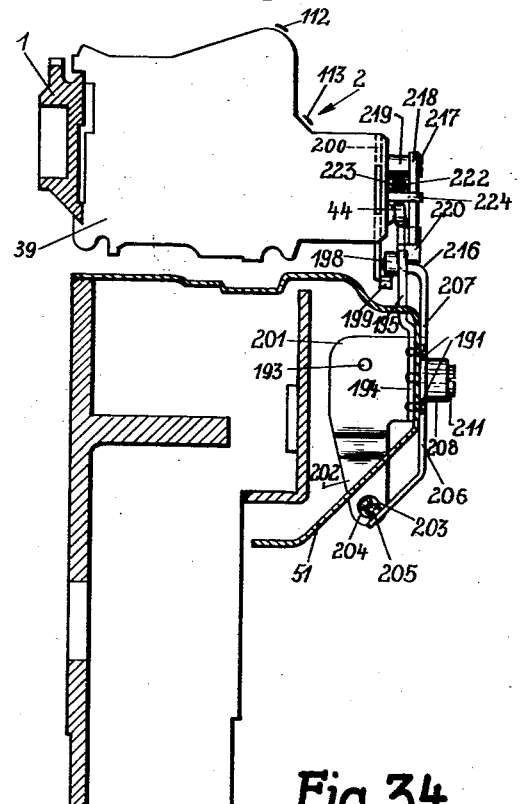
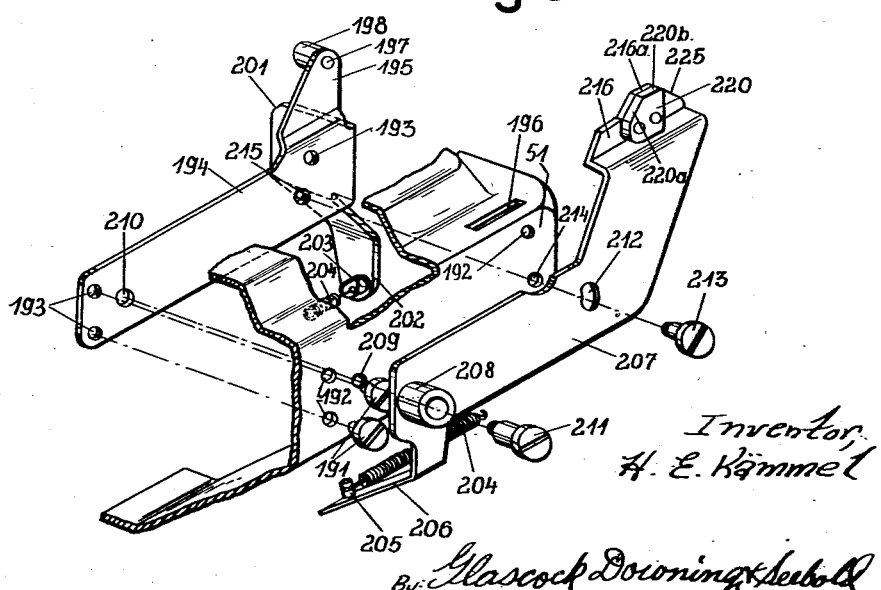

Nov. 28, 1944.                H. E. KÄMMEL                2,364,025
                         COMPLEMENTARY TOTALIZER
                   Filed Feb. 28, 1939      16 Sheets-Sheet 13
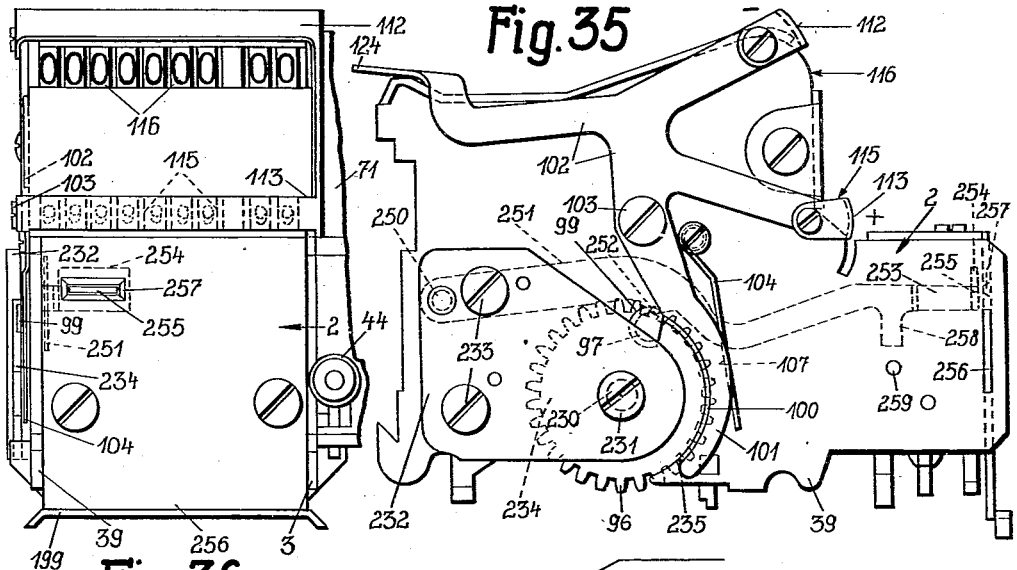
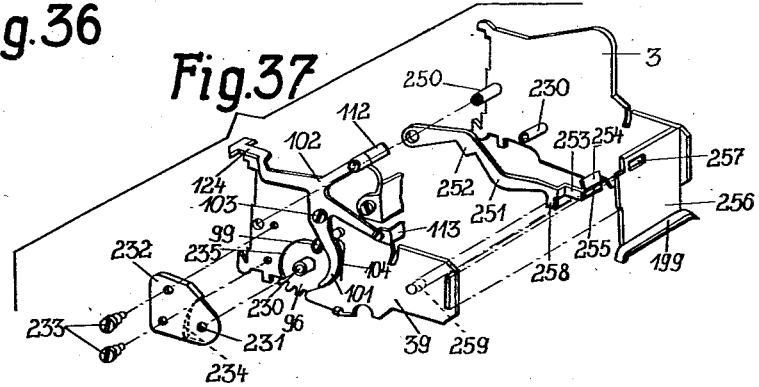
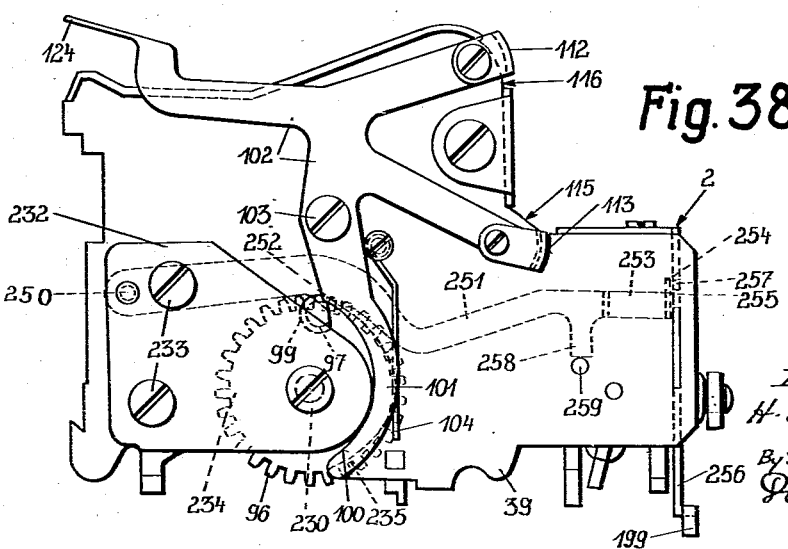
Inventor,
H. E. Kämmel
By: Glascock
Downing &
Seebold
Attys.

Nov. 28, 1944.  H. E. KÄMMEL  2,364,025
COMPLEMENTARY TOTALIZER
Filed Feb. 28, 1939  16 Sheets-Sheet 15

Inventor,
H. E. Kämmel
By: Glascock Downing & Seebold Attys.

Nov. 28, 1944.   H. E. KÄMMEL   2,364,025
COMPLEMENTARY TOTALIZER
Filed Feb. 28, 1939   16 Sheets-Sheet 16

Inventor
H. E. Kämmel
By: Glascock Downing & Seebold
Attys.

Patented Nov. 28, 1944

2,364,025

UNITED STATES PATENT OFFICE 2,364,025

COMPLEMENTARY TOTALIZER

Hugo Ernst Kämmel, Zella-Mehlis, Germany; vested in the Alien Property Custodian Application February 28, 1939, Serial No. 259,030
In Germany March 4, 1938

26 Claims. (Cl. 235—59)

This invention relates to a complementary totalizer, especially for typewriting-calculating machines equipped with total taking means and with mechanism for controlling the "fugitive 1."

Machines of this kind are known in which the "fugitive 1" is introduced manually. Later, the introduction of the "fugitive 1" was performed automatically as a result of the carriage movement, but these machines had the drawback that the proper total taking of the amounts could not be checked by a clear sign testing or printing device.

These drawbacks are eliminated according to the present invention by arranging that the mechanism for controlling the "fugitive 1" be automatically reversed under control of the numeral wheel at the highest calculating order in the direction of the carriage steps, if a positive total is present in the set of negative numeral wheels after the complementary totalizer has escaped past its active position, and, if a positive total is present in the set of positive numeral wheels before the complementary totalizer arrives in its active position, in such manner that the "fugitive 1" is transferred to the set of positive numeral wheels additively.

In the accompanying drawings, several constructions of the subject matter of the present invention are illustrated by way of example, as follows:

Figs. 1 to 13 illustrate the first construction.

Fig. 1 is a perspective illustration showing a typewriting-calculating machine viewed from the left and the front, the calculating mechanism of the machine being concealed in a casing, the complementary totalizer being shown in full lines and a normal or debit, a minus or credit, and an old balance column totalizer being shown in dot-and-dash lines.

Figs. 2 and 3 are elevations of the complementary totalizer, viewed from the right, that is, in the direction of the arrow in Fig. 1, and showing the mechanism for controlling the "fugitive 1" in its initial and reversed positions, respectively.

Fig. 4 is a detail.

Fig. 5 is a perspective illustration of the complementary totalizer, viewed from the right and the front of the machine.

Fig. 6 shows part of a locking wheel lever in the complementary tatalizer.

Figs. 7 and 8 are elevations of the complementary totalizer, viewed from the right in Fig. 1 and partly broken away, showing one of its locking and setting levers in its active and inactive positions, respectively.

Figs. 9 and 11 are elevations of the complementary totalizer, viewed from the left in Fig. 1 and showing the mechanism which operates a pair of screens or shutters for alternately concealing the positive and the negative sets of numeral wheels in the complementary totalizer, in the initial position in which a "minus" value is calculated, and in the position in which the "minus" value is replaced by a "plus" value, respectively.

Fig. 10 shows diagrammatically the two sets of numeral wheels in the complementary totalizer, and a train of gears connected thereto.

Fig. 12 is a front elevation of the complementary totalizer.

Fig. 13 is a front elevation of the order indicator.

Figures 14, 15:
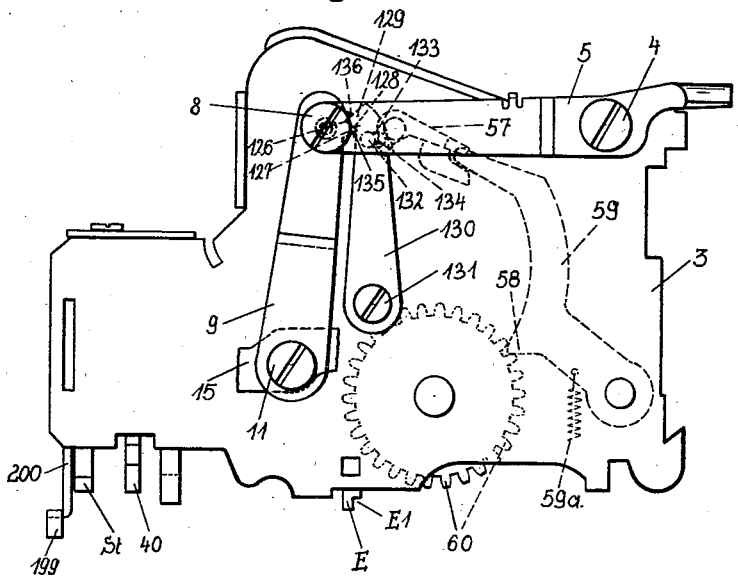

Fig. 14 is an elevation, viewed as in Figs. 7 and 8, of a second construction in which the mechanism controlling the "fugitive 1" is modified.

Fig. 15 shows part of a form to be filled in by the typewriting-calculating machine.

Figs. 16 to 20 are diagrams showing various relative positions of an abutment plate forming part of the screen-operating mechanism at the left of the complementary totalizer, Figs. 9 and 11, and of lugs on the place indicator.

Figs. 21 to 26 show the positions of the complementary and column totalizers for performing the calculating operations required for filling in the form, Fig. 15.

Figs. 27 to 30 illustrate the third construction of the complementary totalizer.

Figs. 27, 28, and 29 correspond to Figs. 2, 3 and 5.

Fig. 30 is a perspective view of a detail.

Figs. 31 to 34 illustrate the fourth construction which is distinguished by a modified tensioning member.

Figure 31:
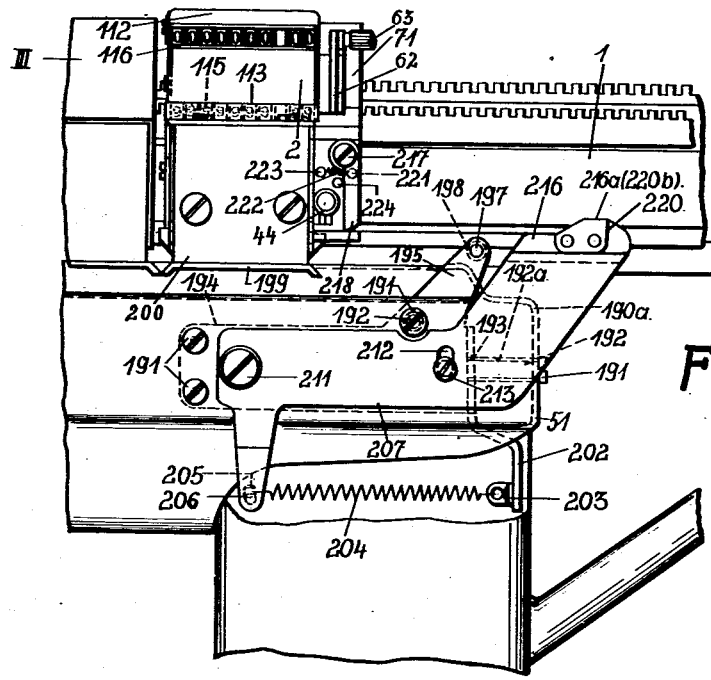
Figure 33:
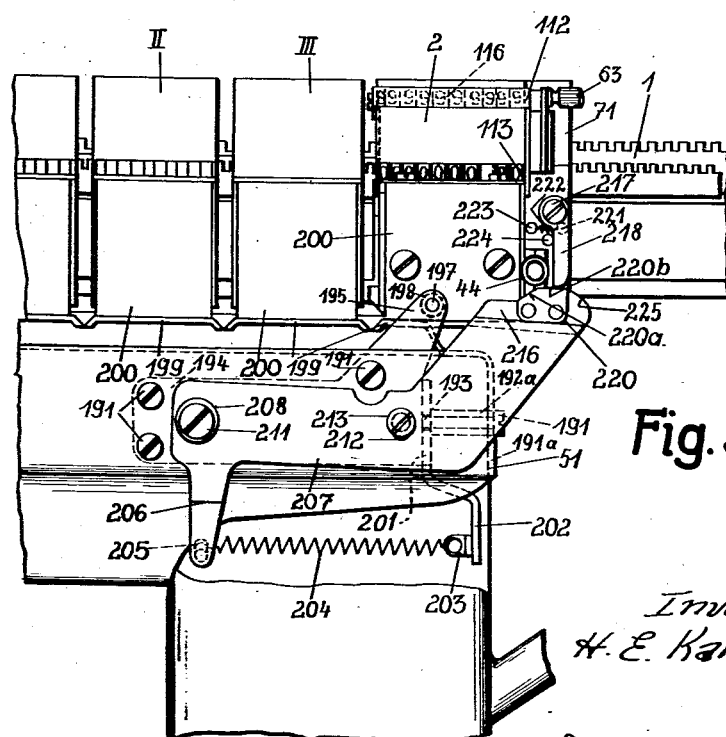

Figs. 31 and 33 are front elevations of the complementary totalizer in its initial position and in its active position with respect to the tensioning member, respectively.

Fig. 32 is a vertical section of the frame of the machine, viewed from the left in Figs. 31 and 33.

Fig. 34 is a perspective illustration of the parts shown in Figs. 31 to 33.

Figs. 35 to 38 illustrate the fifth construction of the complementary totalizer.

Figs. 35 and 38 are elevations corresponding to Figs. 9 and 11.

Fig. 36 is a front elevation of the complementary totalizer, partly broken away at the right.

Fig. 37 is a perspective illustration of the complementary totalizer, with its side plates disengaged.

Figure 39:
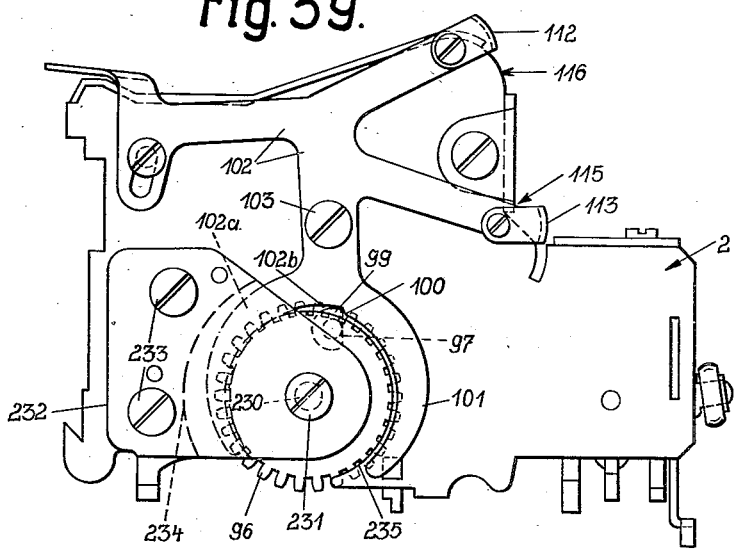
Figure 40:
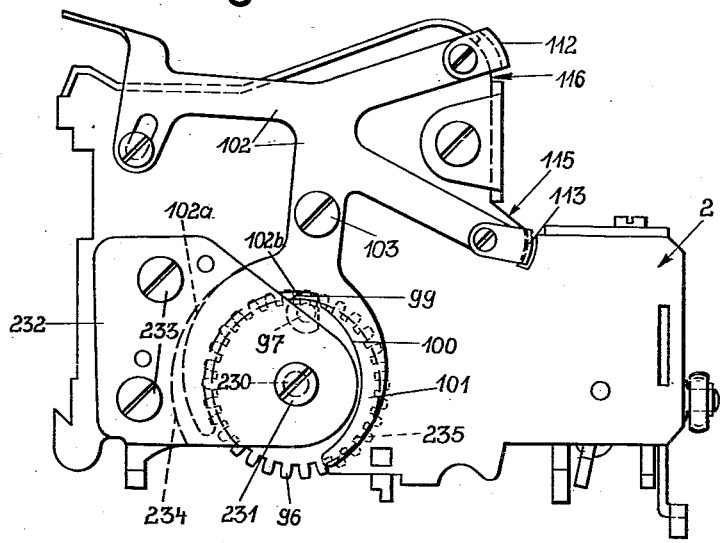

Figs. 39 and 40 which illustrate the sixth construction, are elevations corresponding to Figs. 9 and 11.

Figure 41:
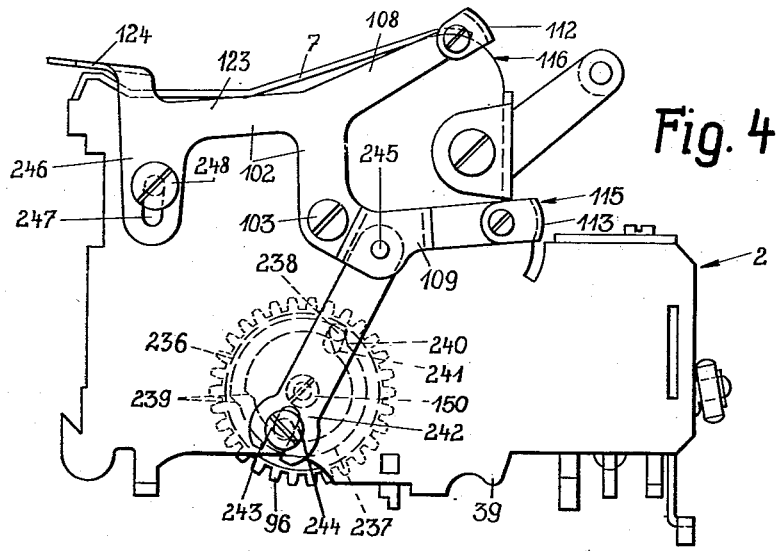
Figure 43:
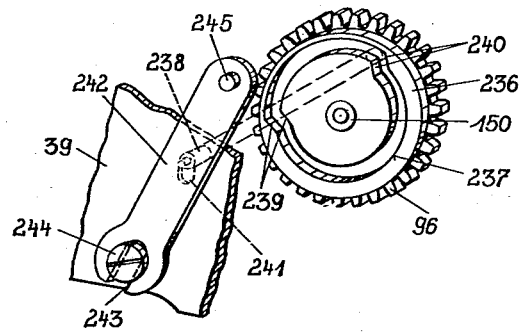
Figure 42:
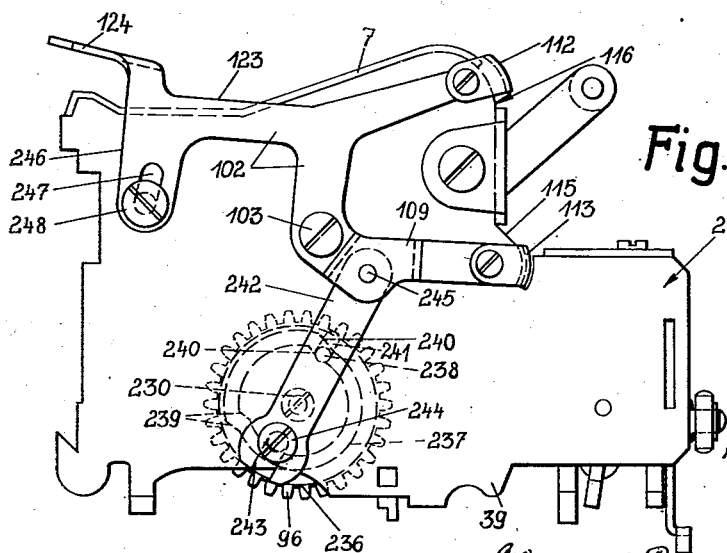

Figs. 41, 42, and 43 illustrate the seventh construction.

Figs. 41 and 42 are elevations corresponding to Figs. 9 and 11.

Fig. 43 is a detail.

Figure 44:
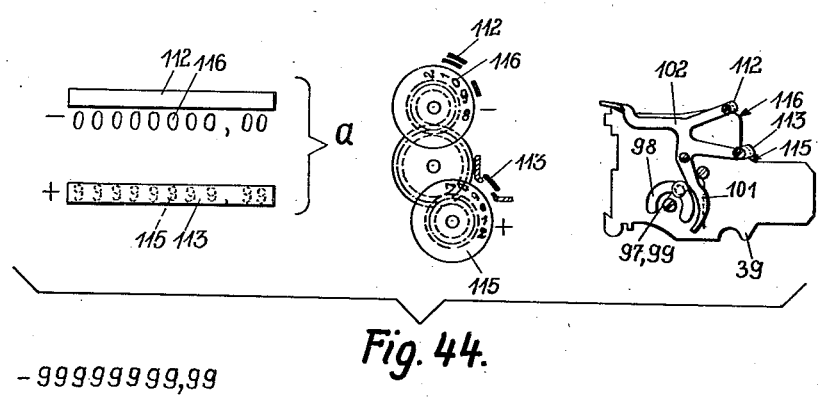
Figure 44A:
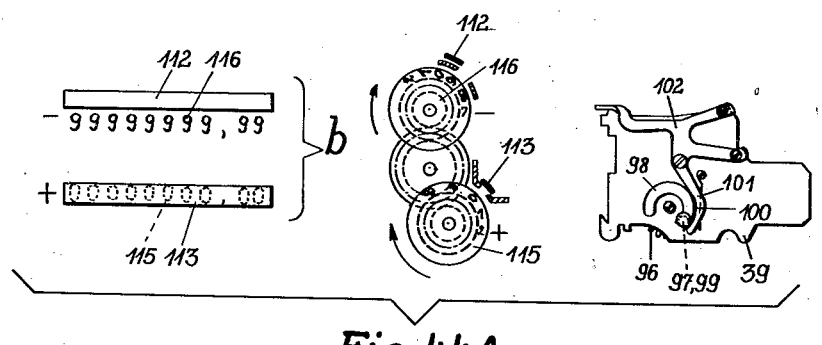
Figure 44B:
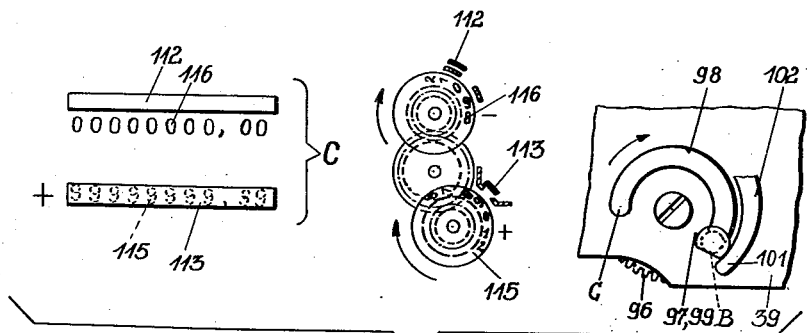

Fig. 44, Fig. 44A and Fig. 44B show a diagram illustrating a calculating example illustrating the object for which the fifth, sixth, and seventh constructions were designed.

Fig. 45 is an elevation of a device for indicating the overstepping of the capacity of the complementary totalizer.

General description

Before the subject matter of the invention proper will be described, it should be noted for a better understanding of the invention, that the entries made in the form F (Fig. 15) may be performed, by way of example, in a typewriting-calculating machine with automatic total taking mechanism, but obviously the complementary totalizer is not limited to typewriting-calculating machines with automatic total taking mechanism, and may be adapted to any other typewriting-calculating, or calculating machine.

A totalizer suspension rail 1 (Fig. 1) which is attached to the paper carriage, not shown, supports three column totalizers I, II and III, shown in dotted lines and a complementary totalizer 2 shown in full lines at the right of the column totalizers. I is a normal or debit column totalizer, II is a credit or minus column totalizer in which the sequence of the numeral on its numeral wheels is reversed, and III is a dummy column totalizer.

The column totalizers I and II are opposite the columns A and B, respectively, of the form F (Fig. 15) and the dummy totalizer III is opposite the column C.

Arranged opposite the column D of the form F is the complementary totalizer 2. This totalizer is equipped with a lower positive set 115 (Fig. 12) of numeral wheels and an upper negative set of numeral wheels 116 which are displayed through slots in the front plate of the complementary totalizer. A screen or shutter 113 is provided for concealing the positive set 115, and a similar screen or shutter 112 is arranged for the negative set 116. The shutters are attached to the free ends of a pair of arms on a four-armed shutter-controlling lever 102 (Figs. 1, 9, 11 and 12) which is fulcrumed at 103 on the left-hand side plate 39 of the complementary totalizer 2. In the normal position of the fugitive one control-selecting lever 102 the screen 113 conceals the positive set 115, and the screen 112 exposes the negative set 116. The lower end of the front plate 200 of each totalizer is provided with a horizontal rib 199 which cooperating with a roller 198, Figs. 1, 31 to 34, at the upper end of a retaining plate 194, prevents rising of the totalizers.

The arrangement of the mechanism for controlling the "fugitive 1" at the right-hand side plate of the complementary totalizer The complementary totalizer 2 is contained between a side plate 3 at the right (Figs. 2 and 5) and a side plate 39 at the left. A controlling cam plate St (Figs. 2 and 3) for determining the state or kind of calculation, and an unlocking cam bar E, reduced as at E1, are arranged between and depend below the side plates of the complementary totalizer 2.

A trip lever 5 (Figs. 2, 3 and 5) is mounted to swing about a bearing screw 4 in the side plate 3, and an inverted V-shaped cam 74 extends longitudinally of its rear arm 73. In the normal position of the trip lever 5, Fig. 2, a laterally extending lug 6 on the trip lever 5, bears on the cover plate 7 of the complementary totalizer 2 and thereby limits the swinging movement of the lever 5 in anti-clockwise direction. A link 9 is pivoted at 8 to the front end of the trip lever 5. At its lower end, the link 9 has an elongated hole 10 through which extends a headed screw 11 projecting from the front arm 14 of a sector lever 15 mounted to swing on a bearing screw 16 in the side plate 3. Further, the headed screw 11 engages in a slot 12 in the rear end of a reversing lever 13 mounted to swing about the right-hand end of a fulcrum bar 38 whose left-hand end is threaded in a hole in the left-hand side plate 39, (Figs. 5, 9 and 11). It will appear that in this manner the reversing lever 13 and the sector lever 15 are swung when the link 9 is shifted.

Teeth 17 at the rear end of the sector lever 15 mesh with a pinion 18 which extends through an elliptical hole 20 in the right-hand side plate 3 of the complementary totalizer 2, and is rigidly connected to a Geneva locking wheel 19. The pinion 18 and the locking wheel 19 are mounted together on a pin 22 (Fig. 6) secured to the locking-wheel lever 23 allotted to the lowest calculating order of the complementary totalizer 2, and are held in place by a nut 24. The pinion 18 meshes with a driving gear 21 (Fig. 6) at the lowest calculating order of the complementary totalizer 2. When the lowest calculating order of the complementary totalizer 2 is brought by the carriage movement into active position in mesh with its master wheel, and the locking wheel lever 23 is swung in the direction of the arrow 25 (Fig. 6), to disengage the pinion 18 from its driving gear 21, one of the interdental spaces 26 in the locking wheel 19 fits over a detent stud 27 which projects from the right-hand side plate 3, to prevent rotation of the pinion 18 and the locking wheel 19 during the operation of the denominational wheel of lowest order.

At the offset front end 28 of the arm 14 of the sector lever 15, a roller 30 is mounted to rotate about a rivet 29 for cooperation with notches 31 and 32 in a spring catch 33. The spring catch 33 is mounted to swing about a bearing screw 34 in the side plate 3 of the complementary totalizer 2 and is urged anti-clockwise by a spring 35 (Figs. 2, 3, and 5) whose front end is secured to a pin 36 riveted into the catch 33 and whose rear end is anchored on a bearing member 37 (Figs. 2 and 3) secured in the side plate 3, so that one of the notches 31 or 32 in the spring catch 33 engages the roller 30 on the sector lever 15, to hold the sector lever 15, and, through, the heated screw 11, also holding the link 9 and the reversing lever 13 in their positions.

The reversing lever 13, is mounted to swing on the fulcrum bar 38 which extends through a hole in the right-hand side plate 3 and is screwed into the left-hand side plate 39 of the complementary totalizer 2. Mounted to swing on the fulcrum bar 38 between the side plates 3 and 39 is a reversing flap 40, an extension 41 (Fig. 5) of which projects beyond the side plate 3 at the right and is engaged by a forked part 42 of the reversing lever 13 to enable the reversing lever to rock the reversing flap 40 to, and hold it firmly in the position to which it has been swung in conformity with the position of the lever 13. When the reversing flap 40 is in its vertical position (Fig. 2) it effects the reversal of the state or add-subtract condition of the typewriting calculating machine, setting the machine to subtraction so that when taking the total of the amount registered in the complementary totalizer 2, italics are printed. In the rocked position (Fig. 3) of the reversing flap 40, it is in inactive position.

The forwardly extending arm 43 of the reversing lever 13 carries a roller 44 which, upon the carriage return, cooperates with a fixed cam 45 (Figs. 1, 5 and 12) on a bracket 46. A drop off 49a is formed at the right-hand end of the cam 45. The bracket 46 as best seen in Fig. 3, is secured to the right-hand end of the front wall 48 of the calculating casing by screws 47 and its upper end 49 projects through a slot 50 (Fig. 1) in the top plate of the calculating casing 51.

The link 9 is equipped with a tooth 52 (Figs. 5, 7 and 8) whose inclined edge 53 is arranged for cooperation with the inclined end 54 of a pawl 55 secured on the right-hand journal 56 of a locking flap 57, Figs. 7 and 8. When the link 9 is shifted upwards by the trip lever 5 the inclined edge 53 of its tooth 52 slides along the inclined end 54 of the pawl 55, turning the pawl and the locking flap 57 anti-clockwise (Fig. 8). The locking flap 57 engages below the front ends of locking and setting arms 59 arranged at the comma places, which locking arms are each provided with a locking tooth 58 (Figs. 7 and 8). Upon actuation of the pawl 55 by the link 9, the locking arms 59 are rocked to disengage their teeth 58 from the teeth of the corresponding driving wheels 60. The driving wheels remain released during the reversal of the control members described in the section entitled "The operation of the complementary totalizer and the mechanism parts cooperating with it," to enable the introduction of the "fugitive 1" into the lowest calculating order wheel and to enable any carrying operations consequent thereon.

Springs 59a, Fig. 7, attached to the locking and setting levers 59 tend to turn the locking flap 57, and with it the pawl 55, clockwise, the inclined flank 54 of the pawl acting on the upper incline 53 of the tooth 52 of the link and moving the link 9 in such manner that the upper edge 10a of its elongated hole 10 bears upon the shank of the screw 11 (Fig. 7) consequently, the link 9 can be raised for the distance limited by the elongated hole during the raising of the locking and setting levers 59 (Fig. 8), to enable the link to release the locking flap 57 before the link can act on the reversing lever 13 and the sector lever 15.

Mounted to swing on the bearing member 37 (Figs. 2 and 3) projecting from the right-hand side plate 3 of the complementary totalizer 2 is a carriage-return releasing bellcrank 62 having a handle 63 at its front end. The rear end of the bellcrank 62 is guided by means of a screw 61 extending through an elongated hole 62a in the bellcrank. Spacing sleeves, not shown, hold the bellcrank at the proper distance from the side plate 3. The bellcrank is arranged for releasing the automatic carriage return of the typewriting-calculating machine, the bellcrank 62 being turned anti-clockwise about the bearing member 37 until a pin 64 at the free end of a flat spring 65 which is riveted to the bellcrank, engages in a depression 66 in the side frame 3. At the same time a lug 67 at the rear end of the bellcrank 62 acts on parts which have been shown in the Patent 2,046,524 and not herein illustrated, the carriage, at the end of its left-hand travel initiating the carriage return.

A check 68 (Figs. 2, 3 and 5) is secured to the right-hand side plate 3 of the complementary totalizer 2, for preventing release of the calculating mechanism of the typewriting-calculating machine while the controlling members of the complementary totalizer 2 are reversed.

Two stays 69 and 70 (Fig. 5) are fixed on the right-hand side plate 3 of the complementary totalizer 2 to which is attached by screws 72 (Fig. 12) a casing 71 (Figs. 1 and 12) adapted to the shape of the side plate 3.

As mentioned, an inverted V-shaped member 74 is arranged at the rear end 73 of the trip lever 5 (Fig. 5) to overhang the toothed upper edge of the supporting rail 1.

*The controlling parts of the order indicator of the typewriting-calculating machine for reversing the controlling members of the complementary totalizer*

A support 76 for an order indicator 77 (Figs. 1, 2, 3 and 13) is secured to the front carriage rail 75 (Fig. 1) and its pointer 78 indicates that calculating order of that column totalizer which is in calculating position at the time. A plate 79 extends to the right from the order indicator 77 and a hinge member 80 is held on the plate 79 by screws 81. Eyes 82 (Fig. 5) of the hinge member 80 support a pintle 83 on which a controlling flap 84 for the trip lever 5 is mounted to swing. By a torsion spring 85 (Figs. 1, 5 and 13) wound about the pintle 83, the controlling flap 84 is turned clockwise (Fig. 2) until an abutment 86 (Fig. 1) on the flap 84, engages the hinge member 80 and holds the flap 84 in its normal, that is, vertical, position. In this position of the flap 84, an inclined contact face 87 (Figs. 1 and 13) at the lower end of a right-hand extension 88 of the flap 84 can cooperate with the inverted V-shaped cam 74 on the trip lever 5. A lug 90 extends at right angles and in forward direction from a left-hand extension 89 (Figs. 1, 2, 3, 5 and 13) of the flap 84 to cooperate with a T-shaped plate 124 at the rear end of the initiating lever 102 (Figs. 1, 9 and 11) mounted on the left-hand side plate 39 of the complementary totalizer 2.

A plate 92 Figs. 2 to 4 and 13 is secured to the lower side of the order indicator 77 by screws 93. An angular projection 94 extending downwards from this lug 92 has an incline 95 (Fig. 13) projecting into the plane of the extension 88 on the flap 84 when the latter is in its normal vertical position, and can act in the same manner on the inverted V-shaped cam 74 of the trip lever 5 on the complementary totalizer. However, this projection 94 will act on the inverted V-shaped cam 74 of the trip lever 5 only if the flap 84 has been swung so far to the rear that its extension 88 is beyond the path of the inverted V-shaped cam 74 (Fig. 4), as will be fully described in the section entitled "The operation of the complementary totalizer and the parts of the mechanism cooperating with it". The arrangement of the extension 88 and the projection 94, in the present instance, has been advantageously so determined that in the normal position (Fig. 2) of the flap 84 its inclined edge 87 acts on the inverted V-shaped cam 74 two carriage steps prior to the arrival of the highest calculating order of the complementary totalizer 2 at the calculating position while the incline 95 of the projection 94 can act on the inverted V-shaped cam 74 only upon the second feeding step of the paper carriage of the typewriting-calculating machine, after the lowest order of the complementary totalizer 2 has passed the calculating position.

*The arrangement of the screen-controlling mechanism of the complementary totalizer*

A headed stud 97 projects from the left-hand face of the driving wheel 96 (Figs. 1, 9 and 11) of highest calculating order in the complementary totalizer 2 which stud traverses an arcuate slot 98 in the left-hand side plate 39 of the complementary totalizer 2. The head 99 (Figs. 9 and 11) of the stud projects beyond the side plate 39 to act on an arcuate edge 100 of one arm 101 of the fugitive one control-selecting lever 102. A spring 104 which is clamped to the side plate 39 by a headed screw 105 (Figs. 9 and 11) and whose downwardly projecting spring arm 106 engages in a recess 107 of the arm 101, tends to turn the control-selecting lever 102 clockwise about the screw 103, forcing the arcuate edge 100 of the arm 101 of the lever 102 against the head 99 of the stud 97, (Fig. 9).

Two arms 108 and 109 project forwardly from the control-selecting lever 102 to which the screens 112 and 113 (Figs. 9 to 12) are secured by screws 110 and 111, respectively. The screens are connected by a strip 114 (Fig. 2) to constitute a frame. When the control-selecting lever 102 is in its normal position according to Fig. 9, the screen 113 conceals the positive set of numeral wheels 115 in the complementary totalizer 2, (Fig. 12) while the screen 112 exposes the negative set of numeral wheels 116 of the totalizer 2. It should be noted that in this case the "fugitive 1" is already introduced into the lowest calculating place by cooperation of the roller 44 (Figs. 2, 3 and 5) on the reversing lever 13 and the cam 45, as will be described in the section entitled: "The operation of the complementary totalizer and the parts of the mechanisms cooperating with it," whereby all numeral wheels of the negative set 116 are moved to "zero" (Fig. 1).

When the negative numeral wheels 116 (Fig. 12) of the column totalizer 2 after being cleared by the addition of "1" effected by the lever 13, show "zero" (Fig. 10), the concealed positive numeral wheels 115 show "9." If in this case a value, for instance, "0.80," is introduced positively into the complementary totalizer 2, the exposed negative numeral wheels 116 indicate the valve "9 999 999.20," while the concealed positive numeral wheels 115 indicate the value "0 000 000.79." Since during the introduction a tens transfer as far as the highest order in the totalizer has occurred in the negative numeral wheels, the driving wheel 96 is rotated one step in the direction of the arrow 117 (Figs. 9 and 11). The head 99 of the stud 97 on the driving wheel 96 now moves from the position in Fig. 9 into the position in Fig. 11, releasing the edge 100 of the arm 101 on the control-selecting lever 102 which is now free to swing clockwise under the action of the spring 104 until the lower edge 118 of the screen 113, which engages in a slot 119 in the left-hand side plate 39 of the complementary totalizer 2, and in a slot 120 in its right-hand side plate 3 (Fig. 3) abuts against the respective lower ends 121 and 122 of the slots 119 and 120. The screen 112 now conceals the negative set of numeral wheels 116 in the complementary totalizer 2, while the screen 113 exposes the positive set of numeral wheels 115.

A rearwardly extending arm 123 is arranged on the control-selecting lever 102 which is offset to the right and terminates in a T-shaped plate 124 (Fig. 1), the inclined edge 125 at the left of the T-shaped plate 124 lying in the path of the lug 90 (Figs. 1, 2, 3 and 5) of the flap 84 in the normal position of the control-selecting lever 102, as shown in Fig. 9. In the position of the lever 102 according to Fig. 11, the T-shaped plate 124 has been swung so as to place its inclined edge 125 above the path of the lug 90 of the flap 84, to escape past the lug without influencing it.

*The operation of the complementary totalizer and the parts of the mechanism cooperating with it*

In the following, the operation of the complementary totalizer 2 and its controlling members according to the invention, in cooperation with the controlling parts of the order indicator 77 and the cam 45 (Fig. 1), will be described for the accounting entries in the form F (Fig. 15).

It is assumed that all members of the complementary totalizer 2 and all parts of the order indicator 77 occupy their normal positions, as shown in Figs. 1, 5 and 9. In the normal position of the members of the complementary totalizer 2 as shown in Figs. 5 and 9, the "fugitive 1" has already been added to the lowest calculating order of the negative set of numeral wheels 116 in the complementary totalizer 2. Consequently the train of gears of this calculating order was turned from "9" to "0" and due to the tens transfer which occurs during this operation and is transmitted from one calculating place to the next higher calculating order of the complementary totalizer 2, all numeral wheels of the negative set of numeral wheels 116 have been turned to "zero." During this rotation of the driving wheel 96 (Fig. 9) of the highest calculating order of the complementary totalizer 2 against the direction of the arrow 117, the head 99 of its stud 97 has acted on the edge 100 of the arm 101 and turned the control-selecting lever 102 anti-clockwise against the action of the spring 104, so that the screen 112 exposes the negative set of numeral wheels 116 (Fig. 12) while the screen 113 conceals the positive set of numeral wheels 115 all of which have now been turned to "9." The T-shaped plate 124 of the control-selecting lever 102 (Figs. 1 and 9) has also been moved into the path of the lug 90 on the flap 84 of the order indicator 77.

The first operation is that of printing a "credit" amount, for instance, RM. "135,25" in the column B of the form F, as shown in Fig. 15, and of simultaneously entering this value in the minus or credit column totalizer II (Fig. 1) and in the complementary totalizer 2. As mentioned, the sequence of the numerals on the numeral wheels in the minus or credit column totalizer II is the reverse of the normal sequence. The minus totalizer II is equipped with a state controlling cam plate St (Figs. 2, 3, 9, 11 and 21) by which the state control mechanism is set for subtraction, and the master wheels A1, A3 and A4 (Fig. 21) are driven in the direction of the arrow in wheel A1 (Fig. 9). By a clutch-controlling cam plate V (Fig. 21), which is also arranged on the minus column or credit totalizer II, a totalizer selecting clutch K (Figs. 21-26) is operated to connect the master wheel A3 to the power drive of the machine. As also mentioned, the unlocking plate E (Figs. 9 and 11) of the complementary totalizer 2 which normally unlocks the calculating mechanism of the typewriting-calculating machine in the frame 51, is reduced at E1 for preventing uncoupling of the master wheel A4 from the power drive by the unlocking plate E when the complementary totalizer 2 moves into active position with respect to the master wheel A4.

By depressing the corresponding tabulator key, not shown, the hundreds calculating order in the minus column or credit totalizer II is moved into calculating position, whereupon by depressing the calculating key in the calculating keyboard, not shown, of the typewriting calculating machine, which corresponds to the value "1", the number "1" is typed in the column B of the form F, and entered in negative sense but in the form of addition into the hundreds calculating order of the minus column totalizer II. The numeral wheel at the hundreds calculating order now displays "1." At the same time, a "1" is entered into the complementary totalizer 2 subtractively and the hundreds calculating order of the negative set of numeral wheels 116 in the complementary totalizer displays "1." The usual escapement advances the carriage for one step in letter spacing direction, whereupon a "3", and, as the carriage moves farther, the other numbers of the "credit" amount "135,25" are typed similarly in the column B of the form F and calculated in the minus column or credit totalizer II and in the complementary totalizer 2, so that the minus totalizer II and the negative numeral wheels 116 of the complementary totalizer 2 indicate the value "135,25" (Fig. 21).

Now, an "old balance" of RM "20.10," which was obtained from an earlier form as a plus value, is to be typed in the old balance column C of the form F and calculated in the complementary totalizer 2. As the dummy column totalizer III is without the clutch-controlling cam plate V, Fig. 21, the totalizer selecting clutch K remains in its normal position in which the master wheels A1 and A2 (Fig. 22) are coupled to the drive. Nor has the dummy column totalizer III a state controlling cam plate St, for controlling the kind of operation so that amounts entered by depression of keys are accumulated additively at this time.

When the dummy column totalizer III has been tabulated with its tens of marks driving wheel 60 in mesh with the master wheel A1, the value "20.10" is typed in the old balance column C and at the same time is entered additively into the corresponding calculating orders in the complementary totalizer 2 so that the value "115.15" (Fig. 22) is indicated at the close of the calculating operations by the exposed negative set of numeral wheels 116 of the complementary totalizer 2. With the entry of the units of cents digit, the paper carriage with its complementary totalizer 2 escapes one letter space to the left and positions the inclined side 125 (Fig. 1) of the T-shaped plate 124 of the control-selecting lever 102 just to the right of the lug 90 on the trip lever controlling flap 84 (Fig. 16).

The value "115.15" which has been entered in the complementary totalizer 2 is now to be registered as a new balance in the new balance column D of the form F by total taking. For this purpose, the hundreds of marks wheel of the complementary totalizer 2 is brought to active position with respect to the master wheel A1 (Fig. 23) of the calculating mechanism in the frame 51 of the typewriting-calculating machine by depression of the corresponding tabulator key. During the carriage movement which was started by the tabulating operation, and two steps before the wheel 96 of highest order in the complementary totalizer 2 arrives in the active position, the inclined side 125 of the T-shaped plate 124 of the control-selecting lever 102 engages the front edge 91 of the lug 90 on the trip lever controlling flap 84 (Fig. 17) and swings the flap anti-clockwise against the torsion spring 85, as shown in Fig. 4, about the pintle 83, to shift the extension 88 at the right of the flap 84 rearwardly out of the plane of the inverted V-shaped cam 74 of the trip lever 5 (Figs. 4 and 7). During the continued advance of the paper carriage to the left, the rear edge 124a (Fig. 1) of the T-shaped plate 124 holds the flap 84 in its swung-out position until the inverted V-shaped cam 74 of the trip lever 5 has moved past the extension 88 of the flap 84. When the edge 124a of the T-shaped plate 124 releases the lug 9 of the flap 84, the flap swings back into its normal position, as shown in Fig. 2, under the action of the torsion spring 85, and the abutment 86 of the flap 84 again bears on the hinge member 80. Since, the complementary totalizer 2 has a controlling cam plate St for controlling the state or kind of operation (Fig. 23), the wellknown calculating mechanism concealed within the frame 51 is reversed to condition the master wheel A1 for subtraction when the plate St moves into active position. Due, however, to the reversing flap 40 (Figs. 2 and 5) of the complementary totalizer 2 being held in its vertical or normal position by the reversing lever 13, this flap reverses to addition the calculating mechanism of th typewriting-calculating machine—which had been set to subtraction by the controlling plate St of the complementary totalizer 2—by operating the general reversing key G (Fig. 1) for reversing the state of the machine because the "minus" value "115.15" indicated by the negative set of numeral wheels 116 in the complementary totalizer 2 can be withdrawn from the complementary totalizer only by conditioning the machine for addition. When the general reversing key G for reversing the state of the typewriting calculating machine is operated, the value "115.15" is typed in italics upon total taking, characterizing it as a negative balance.

The calculating mechanism concealed by the frame 51 is released for operation by the unlocking plate E of the complementary totalizer 2.

After the hundreds of marks calculating order of the complementary totalizer 2 has been brought into calculating position, the value "115.15" is withdrawn from the complementary totalizer 2 and typed in the new balance column D of the form F (Fig. 15) by the automatic total taking mechanism.

After the units digit "5" of the value "115.15" has been withdrawn from the negative set of numeral wheels 116 in the complementary totalizer 2, and typed in the new balance column D of the form F, the negative numeral wheels 116 again show "zero" and the value "135.25" appears in the minus or credit column totalizer II (Fig. 23). In consequence of the typing of the units digit "5" of the value "115.15" the carriage advances one letter space and when this step has been performed, the left-hand incline of the inverted V-shaped cam 74 on the trip lever 5 (Fig. 1) is adjacent the right-hand side of the projection 94 on the controlling lug 92 (Figs. 1, 13, and 18). Now the paper carriage of the typewriting-calculating machine is advanced one step farther to the left. At the same time, the left-hand incline of the inverted V-shaped cam 74 on the trip lever 5 wipes along the incline 95 of the fixed controlling lug 92, and the trip lever 5 (Figs. 3 and 5) is swung clockwise about its bearing screw 4 to raise the link 9 which, in turn, rocks the locking and setting levers 59 (Figs. 7 and 8) out of locking position by means of the incline 53 of the tooth 52, the incline 54 of the pawl 55, and the locking flap 57, as shown in Fig. 8, to release the driving wheels 60 of the complementary totalizer 2. As the link 9 rises farther, the lower end of its elongated hole 10 acts on the screw 11 in the front arm 14 of the sector lever 15 and turns the sector lever 15 clockwise about its bearing screw 16. The roller 30 arranged at the offset front end 28 of the sector lever 15 leaves the notch 31 in the spring catch 33 to which the spring 35 is connected, and is engaged by the notch 32, holding the sector lever 15 in this position (Fig. 3). The swinging movement of the sector lever 15 is transmitted to the reversing lever 13 by the screw 11 and the slot 12 and rocks the reversing lever 13 anti-clockwise about the shaft 38 to cause its forked part 42, to swing the reversing or state control flap 40 into the inactive position shown in Fig. 3.

When the sector lever 15 swings clockwise, its teeth 17 turn the pinion 18 and the locking wheel 19 anti-clockwise for one unit, and the pinion 18 (Fig. 6) turns the driving wheel 21 of the lowest calculating order in the complementary totalizer 2, with which it meshes, clockwise for one unit. In consequence, the "fugitive 1" is added to the lowest calculating order of the complementary totalizer 2, so that the numeral wheel of the said calculating order in the positive set of numeral wheels 115, which was at "9," is now turned from "9" to "0." In consequence of the positive tens transfer all numeral wheels of the positive numeral wheel set 115 are progressively turned from "9" to "0." When the driving wheel 96 of the highest calculating order of the complementary totalizer 2 (Fig. 9) is rotated in the direction of the arrow 117, by this transfer of tens the head 99 of its stud 97 releases the arcuate edge 100 of the arm 101 and the control-selecting lever 102 is now swung clockwise to the position shown in Fig. 11 under the action of the spring, 104. In this position, the lower edge 118 of the lower screen 113 is seated on the lower ends 121 and 122 (Fig. 3) of the respective slots 119 (Fig. 11) and 120 (Fig. 3) in the side plates 3 and 39 of the complementary totalizer 2 and exposes the positive set of numeral wheels 115 in the complementary totalizer 2, and the screen 112 conceals the set of negative numeral wheels 116.

This reversing of the controlling members and the introduction of the "fugitive 1" achieved thereby are necessary for printing the clear sign asterisk at the end of each total taking operation from the complementary totalizer 2, which is only possible in consequence of the zero position of the positive numeral wheels set 115 and is effected by depression of a key, not shown.

The arrows shown in full lines in Fig. 10 indicate the direction of rotation of the several wheels for additive calculation and the arrows shown in dotted lines indicate the direction of rotation for subtractive calculation.

When the clear sign has been printed in the new balance column D of the form F, the lug 67 of the bellcrank 62 (Fig. 3) which has previously been manually set to its active position, releases the automatic carriage-return device of the machine upon the subsequent step of the paper carriage as described in the Mez Patent 2,046,524 for return to the right hand marginal stop Ra.

When the paper carriage of the typewriting-calculating machine has nearly reached the limit of its right-hand travel, the roller 44 at the front end of the reversing lever 13 (Fig. 3) ascends the inclined edge of the cam 45 of the fixed bracket 46 (Figs. 1 and 12) whereby the reversing lever 13 is returned into its normal position, as shown in Figs. 2 and 5. Due to the connection 11 between the reversing lever 13, and the sector lever 15, the link 9 is pulled down. The incline 52a (Fig. 3) of the tooth 52 of the link acts on the upper edge 55a of the pawl 55, swinging the pawl anti-clockwise and moving the locking levers 59 into inactive position through the locking flap 57 (Fig. 8).

When the reversing lever 13 (Fig. 3) is swung back, it swings back the sector lever 15 anti-clockwise about its bearing screw 16 through the screw 11. The roller 30 at the front end 28 of the sector lever leaves the notch 32 in the spring catch 33 and enters the notch 31. The teeth 17 of the sector lever 15, through pinion 18 (Fig. 6) rotate the driving wheel 21 (Fig. 6) which is allotted to the lowest calculating place of the complementary totalizer 2, in anti-clockwise direction, thereby initiating a tens transfer which is continued from calculating order to calculating place, to restore the negative set of numeral wheels 116 to zero. Upon rotation of the driving wheel 96 (Fig. 11) allotted to the highest calculating order, against the direction of the arrow 117, the stud 97 on the wheel 96 swings the control selecting lever 102, through its arm 101, anti-clockwise and the screens 112 and 113 are so moved that the screen 112 exposes the negative set of numeral wheels 116. All parts of the complementary totalizer 2 and the controlling members operating them, are again in the normal positions shown in Figs. 5 and 9.

In the next line of the form F, a "debit" amount of RM "525.32" is to be entered. The normal or debit column totalizer I (Figs. 1 and 24) is without a state controlling cam plate St for determining the state of the calculating mechanism which is concealed by the frame 51, and therefore, the value "525.32" is entered additively into the complementary totalizer 2. However, the debit column totalizer I has a totalizer-selecting clutch-controlling pate V (Fig. 24) which so controls the clutch K that the driving wheel A2 which is normally coupled to the drive, is now uncoupled therefrom (Fig. 24). When the first digit "5" of the value "525.32" is entered into the complementary totalizer 2, the screens 112 and 113 are swung, for the following reasons.

When the train of gears at the hundreds of marks calculating order in the complementary totalizer 2 is rotated in additive direction for five units, a tens transfer to the next higher calculating order occurs when the numeral wheel at the hundreds of marks calculating order of the—for the present concealed—positive set of numeral wheels 115 turns from "9" to "0." This tens transfer is continued as far as the highest calculating order of the complementary totalizer 2. In consequence, the driving wheel 96 (Fig. 9) of the highest calculating order is turned in the direction of the arrow 117 for one unit. The head 99 (Fig. 9) of the stud 97 on the wheel 96 releases the arcuate edge 100 of the arm 101 on the control-selecting lever 102, as shown in Fig. 11. Under the action of the spring 104, the control-selecting lever 102 now swings clockwise, the screen 112 conceals the set of negative wheels 116 (Fig. 11) in the complementary totalizer 2, and the screen 113 exposes the positive set of wheels 115. The T-shaped plate 124 of the control-selecting lever 102 is rocked upwardly out of the plane of the lug 90 on the trip lever controlling flap 84 (Fig. 11). The fugitive numeral wheel in the set 115 of the hundreds of marks calculating order of the complementary totalizer 2 now shows "4" when the calculating operation has been completed which is one unit short of the correct digit. The "1" that is missing here is added by tens transfer to the "4" of the hundreds of marks calculating order when the second digit "2" of the value "525.32" is introduced into the tens calculating order, so that the numeral wheel at the hundreds of marks denomination shows the correct value "5." The other digits of the "debit" amount "525.32" are introduced in the same way, so that the positive set of numeral wheels 115 in the complementary totalizer 2 shows the value "525.31." The missing or fugitive "1" of the last digit is automatically added later.

Obviously the correct value "525.32" is introduced into the debit column totalizer I whose set of numeral wheels, as mentioned, has the normal sequence of numerals, and the value is typed in the debit column A of the form F. For entering the new balance in the complementary totalizer 2 it is necessary to depress the reversing key G (Fig. 1) which reverses the state control or kind of operation, for printing the old or negative balance "115.15" in the old balance column C of the form F in italics, since it is a negative item, after the dummy totalizer III has been tabulated into its active position, and to transfer the value "115.15" into the complementary totalizer 2 subtractively. Since the dummy totalizer III is without the totalizer-selecting clutch controlling plate V, the clutch K remains in its normal position when the dummy totalizer III moves into active position and the master wheel A2 partakes in the rotation of the master wheel A1 (Fig. 25). At the close of these calculating operations, the set of positive numeral wheels 115 in the complementary totalizer 2 will indicate the value "410.16" (Fig. 25). The fugitive "1" which is required in the lowest calculating order, is automatically entered as follows.

When the value "115.15" has been entered and typed, and after the carriage step released by the typing of the "5" in the lowest calculating order, the left-hand inclined face of the inverted V-shaped cam 74 (Fig. 1) of the trip lever 5 is only a short distance from the incline 87 of the extension 88 of the trip lever controlling flap 84 (Fig. 19) which flap has remained in vertical position because the T-shaped plate 124 of the control-selecting lever 102 has occupied the position shown in Fig. 11, in which it passes above the lug 90 of the flap 84.

For typing the new balance "410.16" (Fig. 25) which has been entered in the complementary totalizer 2, the totalizer is tabulated into active position. At the start of the carriage tabulating movement to the left, the inverted V-shaped cam 74 of the trip lever 5 (Figs. 5 and 13) is engaged by, and descends along, the incline 87 of the extension 88 of the trip lever controlling flap 84. The trip lever 5 (Fig. 2) is thus caused to swing clockwise about its bearing screw 4, and the link 9, the reversing lever 13, and the sector lever 15 are rocked into the positions shown in Fig. 3. The sector lever 15 turns the pinion 18, and the driving wheel 21 (Figs. 5 and 6) one step to add the "fugitive 1" to the lowest calculating order of the positive set of numeral wheels 115 in the complementary totalizer 2 which now indicates the correct value "410.17" (Fig. 20). The control-selecting lever 102 is not influenced by this, as a tens transfer which could rotate the wheel 96 at the highest calculating order, does not occur. After the hundreds of marks calculating order of the complementary totalizer 2 has moved into active position, the value "410.17" is withdrawn by total taking from the complementary totalizer 2 and the value is typed in the new balance column D of the form F. It should be noted that since the reversing flap 40 for controlling the state or kind of operation is swung into the position shown in Fig. 3 in which the flap is inactive with respect to the control of the calculating mechanism of the typewriting-calculating machine which is concealed by the frame 51, the value "410.17" is typed in straight figures indicating a "plus" or positive balance, and the non-concealed positive numeral wheels in the set 115 of the complementary totalizer 2 are returned to "zero" (Fig. 26). By the step of the carriage which is started by the units wheel of the typing of the units digit "7" in the value "410.17" the units wheel of the complementary totalizer 2 moves out of active position. In this position of the complementary totalizer 2, a further step of the carriage is effected, the inverted V-shaped cam 74 of the trip lever 5 (Fig. 1) contacting and sliding below the fixed controlling lug 92 of the order indicator 77 of the typewriting calculating machine. In this position of the complementary totalizer, the clear sign is printed by depression of the clear sign key, not shown, whereupon the automatic carriage return to the right hand marginal stop, as described in U. S. Patent 2,046,524, occurs again. During this movement of the paper carriage of the typewriting-calculating machine to the right, the roller 44 of the reversing lever 43 rides up the incline 45 of the cam on the bracket 46, to effect the return of the controlling members of the complementary totalizer 2 into their normal positions (Figs. 5 and 9).

The purpose for which the second incline 49a is provided on the cam 49 (Figs. 1 and 5) is as follows.

At the end of the carriage return, that is, in the right hand final position of the paper carriage of the typewriting-calculating machine, it may happen that the operator inadvertently knocks against the roller 44 on the reversing lever 13 and, without knowing it, reverses the set positions of the controlling members of the complementary totalizer 2 (Fig. 3). This would result in a miscalculation during the operation of the complementary totalizer 2.

During tabulation, that is, during the movement of the paper carriage to the left, the roller 44 of the reversing lever 13 because of the provision of the incline 49a, rises on the incline 49a and returns the controlling members of the complementary totalizer 2 into the normal positions according to Fig. 2.

A second construction of the mechanism for rendering inactive the locking and setting levers 59 for the driving wheels 60 of the complementary totalizer 2 is shown in Fig. 14. In this construction, the link 9 is equipped with a tooth 127 having an inclined edge 126. When the trip lever 5 is swung clockwise about its pivot 4, the ascending link 9, with the incline 126 of its tooth 127, acts on an incline 128 at the lower side of a nose 129 at the upper end of an arm 130 mounted to swing about a pivot 131 in the right-hand side plate 3 of the complementary totalizer 2, and swings the arm 130 clockwise about its pivot 131. A pin 132 riveted into the arm 130 extends laterally through a corresponding longitudinal slot 133 in the right-hand side plate 3 of the complementary totalizer 2. When the arm 130 is swung clockwise, the pin 132 acts on a short arm 134 of the locking flap 57, to swing the flap anti-clockwise and withdraw the teeth 58 of the locking and setting levers 59 clear of the wheels 60. In the reversed or operated position of the trip lever 5 and the link 9, as shown in Fig. 3, the tooth 127 of the link 9 has moved beyond the nose 129 of the arm 130, and the springs 59a return the locking and setting levers 59, the unlocking flap 57, the arm 130, and its pin 132, into their normal positions as shown in Fig. 14.

When the reversing lever 13, the sector lever 15, the link 9, and the trip lever 5 return into their initial positions (Fig. 2) the edge 135 of the tooth 127 on the link 9 acts on an incline 136 on the arm 130, whereby the arm 130 is again swung clockwise and the driving wheels 60 of the complementary totalizer 2 remain unlocked for the duration of the reversal through the pin 132, the short arm 134 of the unlocking flap 57, and the flap itself.

In this construction of the mechanism for rendering inactive the locking and setting levers 59, the unlocking of the driving wheels 60 of the complementary totalizer 2 is accomplished more rapidly and more reliably on account of the action of the pin 132 on the short arm 134 of the unlocking flap 57.

*The arrangement of the controlling members at the complementary totalizer according to the third construction and Figs. 27 to 30*

On the right-hand side plate 3 of the complementary totalizer 2—which is substantially similar to the one described with reference to Figs. 1 to 13—a spring catch 150 is mounted to swing about the bearing screw 4 instead of the trip lever 5 (Figs. 27, 28 and 29) and the bearing screw 4 is inserted in a bearing bracket 155. A spring 151 which at one end is suspended in a hole 152 in the catch 150, and at the other end is anchored on a pin 153 in the right-hand side plate 3, turns the catch 150 anti-clockwise, the normal position of the catch being defined by a lug 154 at right angles to the catch 150 bearing against the upper surface of the bearing bracket 155. In this normal position, the front end 156 of the catch 150 engages in a rectangular recess or shoulder 157 formed in the upper arm of a bellcrank 158, to hold the bellcrank against swinging clockwise about its bearing screw 159 which is inserted in the side plate 3 (Fig. 27). A washer 160 (Fig. 29) holds the bellcrank 158 at the required distance from the side plate 3 of the complementary totalizer 2. The forwardly projecting arm of the bellcrank 158 is forked, as at 161, to engage a pin 162 in a slide 163. An elongated hole 164 is made in the upper portion of the slide 162 through which extends a pin 165 secured in the side plate 3 of the complementary totalizer 2. By these means, the slide 163 is mounted for vertical reciprocation. A pin 166 at the lower end of the slide 163 engages in the elongated slot 12 at the upper end of the reversing lever 13 and in a hole 167 of a sector lever 168. A head 169 on the pin 162 engaging the left-hand side face of the fork 161 on the bellcrank 158 prevents disengagement of the slide 163.

The sector lever 168 is mounted to swing about the bearing screw 16 in the side plate 3. Its teeth 17 (Figs. 28 and 29) mesh with the pinion 18 which extends into the complementary totalizer 2 through the elliptical hole 20 in its side plate 3 where it meshes with the driving wheel 21 (Fig. 6) of the lowest calculating order. The pinion 18 and the Geneva locking wheel 19 connected thereto are mounted to rotate about the pin 22 and are held in place by a nut 24. The teeth of the locking wheel 19 cooperate with a locking cam 170 which is connected to the sector lever 168 by screws and pins. A recess 171 in the locking cam permits a rotation of the wheels 18 and 19 for one unit only at a time.

The reversing lever 13 is mounted to swing on the fulcrum rod 38 which extends through a hole in the right-hand side plate 3 of the complementary totalizer 2 and is screwed into its left-hand side plate 39 (Fig. 29). A washer 38a holds the reversing lever 13 at the required distance from the side plate 3 of the complementary totalizer 2. The forked part 42 of the reversing lever 13 (Figs. 27, 28 and 29) engage the reversing flap 40 for controlling the state or kind of operation of the machine. Secured to the rearwardly projecting arm of the reversing lever 13 by screws 172 is a link 173 which has a hole 174 at its rear end. In this hole is secured the lower end of a spring 175, whose upper end is suspended from a pin 176 in the right-hand side plate 3 of the complementary totalizer 2. The pull of the spring 175 normally holds the reversing lever 13, the sector lever 168, the slide 163, and the bellcrank 158 in their initial positions, as shown in Figs. 27 and 29, through the elongated slot 12 in the reversing lever 13 and the pin 166 in the slide 163 which engages in the hole 167 in the sector lever 168. This initial or normal position is determined by the contact of the recess or shoulder 157 in the bellcrank 158 with the front end 156 of the catch 150. In this position the set of negative numeral wheels 116 in the complementary totalizer 2 indicates "zero" (Fig. 29). The set of positive numeral wheels 115 indicates "9".

The roller 44 is provided at the front end of the reversing lever 13 and during the carriage return as well as during the movement of the carriage to the left, cooperates with the inclines 45 and 49a (Fig. 29) of the bracket 46 which, as described with reference to the first construction, is secured to the right hand end of the front wall 48 of the calculating casing by the screws 47.

At its rear end, the catch 150, like the trip lever 5 of the first construction, is equipped with the inverted V-shaped cam 74 for cooperation with the controlling parts arranged at the order indicator 77 of the typewriting-calculating machine. These parts have been fully described in the said section entitled, "The operation of the complementary totalizer and the parts of the mechanism cooperating with it." So they will not be described again.

At the upper end of the slide 163, a tooth 177 is provided for cooperation with a nose 178 at the upper end of an arm 179 mounted to swing on a pin 180 on the side plate 3 of the complementary totalizer 2. A pin 181 secured in the arm 179, projects into the complementary totalizer 2 through an elongated hole 182 in the side plate 3 and cooperates with the usual locking flap 57 (Fig. 27). When the slide 163 moves upwards, the arm 179 is slightly swung clockwise and its pin 181 swings the locking flap 57 anti-clockwise. The flap 57, in turn, raises the locking and setting levers 59 which are only partly shown in dotted lines in Fig. 27, moving their teeth 58 clear of the driving wheels 60 (Figs. 7 and 8) of the complementary totalizer 2, so that the wheels can rotate freely when the controlling members are moved from the positions shown in Fig. 27 into that shown in Fig. 28, and the "fugitive 1" is thereby entered. The same operation occurs when the members move from the position in Fig. 28 into the normal position in Fig. 27, as in this case the tooth 177 of the slide 163 can again act on the nose 178 of the arm 179.

The auxiliary casing 71 (Fig. 12) is secured in place by the two cross stays 69 and 70 (Fig. 29) in the side plate 3 of the complementary totalizer 2. The casing 71 which is adapted to be shape of the side plate 3, conceals the controlling members and the manually set carriage return releasing bellcrank 62 (Figs. 2, 3, and 12).

*The operation of the controlling members of the complementary totalizer of the third construction shown in Figs. 27 to 30*

In the following, the operation of the controlling members of the complementary totalizer 2 and their cooperation with the controlling parts of the order indicator 77, and with the cam 45 will be described for the entries to be made in the form F, Fig. 15. With reference to Fig. 1, it is assumed that a debit, or plus, column totalizer I is opposite the column A of the form F, that a minus or credit column totalizer II is opposite the credit column B, a dummy column totalizer III is opposite the old balance column C, and the complementary or new balance totalizer 2 is opposite the new balance column D, on the totalizer suspension rail 1.

First, let it be assumed that the column totalizers are set to "zero"— and that the controlling members 92 and 94, 88 of the complementary totalizer 2 occupy their initial positions, as shown in Figs. 27 and 29. In this position, the negative set of numeral wheels 116—which is at "zero"—is exposed by the screen 112 and the positive set of numeral wheels 115—which is at "9"— is concealed by the screen 113.

The first item to be booked is the "credit" value of RM "135.25." This value is typed in the credit column B of the form F (Fig. 15) in the manner described in the said section entitled "The operation of the complementary totalizer and the parts of the mechanism connected with it," and is subtractively entered in the minus or credit totalizer II (Fig. 1) and in the complementary totalizer 2, so that at the close of the operation the numeral wheels of the minus or credit column totalizer II and the negative numeral wheels 116 of new balance or the complementary totalizer 2 indicate the value "0 000 0135.25 and the positive numeral wheels 115 which are concealed by the screen 113, are at "9 999 9864.74."

The next operation is that of entering the "old balance" RM "20.10" in the old balance column C of the form F which, at the same time is entered in the complementary totalizer 2 as a positive value. The dummy column totalizer III which is opposite the column C of the form F effects only the necessary controls of the typewriting-calculating machine. At the end of this operation, the negative numerals wheels 116 of the complementary totalizer 2 indicate the value "0 000 0115.15" and the concealed positive numeral wheels 115 are at "9 999 9884.84."

During these accounting operations, the controlling members of the complementary totalizer 2 have not been operated. The consequence is that, when the complementary totalizer 2 and the column D of the form F are tabulated into writing position for typing the "new balance" by total taking from the complementary totalizer 2, the edge 125 (Fig. 29) of the T-shaped plate 124 at the rear of the control-selecting lever 102 which carries the screens 112 and 113 acts on the lug 90 of trip lever controlling flap 84 adjacent the order indicator 77 and swings the flap anti-clockwise into the position shown in Fig. 4. The extension 88 of the flap 84 is moved out of the path of the inverted V-shaped cam 74 at the rear end of the catch 150, so that the cam is not operated. The flap 84 is held in its swung-out position by the rear edge 124a of the T-shaped plate 124, until the cam 74 of the catch 150 has moved past the extension 88 of the flap 84 during the tabulating movement. When the edge 124a of the T-shaped plate 124 has released the lug 90, the flap 84 returns into its initial position (Figs. 27 and 29) under the action of its torsion spring 85.

The tabulating movement of the paper carriage of the typewriting-calculating machine is completed in the present instance when the hundreds of marks calculating order of the complementary totalizer 2 has moved into active position. By automatic total taking operation the value "115.15" is withdrawn from the complementary totalizer 2 and typed in the new balance column D of the form F. The set of negative numeral wheels 116 in the complementary totalizer 2 shows again "zero" after the typing of the value "115.15" and the concealed positive numeral wheels 115 are again at "9." As mentioned, the value "115.15" is typed in italics, to show that it is a negative balance.

After the completion of every total taking from the complementary totalizer 2 it is desirable to check the correctness of the total taking operation in the machine, for which purpose in the present instance the clear sign asterisk (Fig. 15) is printed by depression of a clear sign key, not shown, only when all positive numeral wheels 115 of the complementary totalizer 2 are at "zero." The zero position of the positive numeral wheels 115 is maintained by adding the "fugitive 1" to the last calculating place. For this purpose, the controlling members (Fig.

27) of the complementary totalizer 2 are positively reversed as follows:

After the last number of the value "115.15" has been withdrawn from the set of negative numeral wheels 116 of the complementary totalizer 2, and typed in the new balance column D of the form F (Fig. 15), whereby the carriage step which has been positively started, is completed, the inverted V-shaped cam 74 of the catch 150 has arrived at the right of the fixed projection 94 of the order indicator 77. This relative position of the cam 74 and the projection 94 is shown in Fig. 18 and described in the said section entitled "The operation of the complementary totalizer and the parts of the mechanism cooperating with it." When the paper carriage now moves to the left for one step more, the inverted V-shaped cam 74 of the catch 150 slides down along the incline 95 (Fig. 29) of the projection 94 and the catch 150 (Figs. 27 and 29) is turned clockwise against the action of its spring 151, so that its front end 156 releases the bellcrank 158. Under the action of the spring 175, the reversing lever 13 swings anti-clockwise about the fulcrum rod 38 and, through its elongated slot 12 and the pin 166, raises the slide 163. The tooth 177 of the slide 163, through the nose 178 at the arm 179, the pin 181, and the flap 57 (Fig. 27) disengages the locking and setting levers 59 from the driving wheels 60 (Fig. 14) of the complementary totalizer 2. When the slide 163 ascends, its pin 162 turns the bellcrank 158 clockwise into the position shown in Fig. 28. The swinging movement of the reversing lever 13, through its slot 12, the pin 166, and the hole 167, turns the sector lever 168 clockwise about the bearing screw 16, and the transfer wheels 18 and 19 are rotated for one unit in anticlockwise direction, the pinion 18 adding the "fugitive 1." Herewith, through positive tens transfer, all positive numeral wheels 115 are progressively turned to "zero." At the same time, the screens 112 and 113 are so operated that the screen 112 conceals the negative set of numeral wheels 116—which is now at "9"—and the screen 113 exposes the "zero" indicating positive set of numeral wheels 115. The reversing movement of the reversing lever 13, the slide 163, the bellcrank 158, and the sector lever 168 is limited by the lower end of the elongated hole 164 in the slide 163 abutting against the pin 165 (Fig. 28). The rotation of the transfer wheels 18 and 19 is, after one unit, arrested by the locking cam 170, that tooth 19a (Fig. 28) which is in the corresponding position at the time, bearing against the edge of the cam 170.

After the paper carriage has performed its step and the clear sign has been printed, tabulation and carriage return are effected automatically as described in the patent to Mez, No. 2,046,524.

During the return movement of the paper carriage of the typewriting calculating machine, the complementary totalizer 2 moves into active position with respect to the bracket 46 (Fig. 29), the roller 44 of its reversing lever 13 ascending on the incline 45 of the cam, whereby the reversing lever 13 is returned into its normal position, as shown in Fig. 27, against the action of the spring 175. The slide 163 is moved downwards and its tooth 177 again operates the members 178, 179, 181, 57 and 59, for releasing the driving wheels 60. At the same time, the bellcrank 158 is swung back into its normal position (Fig. 27) anti-clockwise and the catch 150 released by movement of the carriage and totalizer away from the control cam 92, is now swung anti-clockwise by its spring 151 until its lug 154 again engages the upper surface of the bearing bracket 155. The front end 156 of the catch 150 again engages in the recess or shoulder 157 in the bellcrank 158 (Figs. 27 and 29).

When the reversing lever 13 is swung back into its normal position, the sector lever 168 is turned anti-clockwise by the parts 12, 166, and 167, its teeth 17 turning the wheels 18 and 19 for one unit and again entering the "fugitive 1" into the lowest calculating place of the negative set of numeral wheels 116. By the continuous tens transfer, the negative numeral wheels 116, on the one hand, are turned again to "zero" and the positive numeral wheels 115 to "9," and, on the other hand, the screens 112 and 113 are returned into their initial positions according to Figs. 27 and 29.

In the accounting example which has been described by way of example with reference to Fig. 15, there was a negative "new balance" amounting to "115, 15." If, with other accounting operations, a positive "new balance" results, the trip-lever controlling flap 84 of the order indicator 77 remains in its normal position according to Fig. 29 when the complementary totalizer 2 moves into its active position by tabulation, due to the elevation of the edge 125 of the T-shaped plate 124 through the release of the control-selecting lever 102 by the stud 97. In consequence, the extension 88 of the flap 84, before the complementary totalizer 2 arrives in its active position, acts on the inverted V-shaped cam 74 of the catch 150, so that the members 13, 163, 158, and 168 are reversed before the highest calculating order of the complementary totalizer 2 has arrived in its active position.

Providing the catch 150, the bellcrank 158, the slide 163, the sector lever 168, the reversing lever 13, the link 173, and the spring 175, has the advantage that the projection 94, or the extension 88, of the trip-lever controlling flap 84 of the order indicator 77 have only to shift the catch 150 against the action of its spring 151—which is weak—without appreciable effort, while the reversal proper of the controlling members is effected by the spring, 175. As compared with this, in the first and second constructions, Figs. 1 to 13, and Fig. 14, the members are reversed by the projection 94 or the extension 88 of the flap 84 on the order indicator bracket 77. This requires a much greater effort, and the order indicator 77 must be braced for withstanding it. Notwithstanding such extra bracing of the order indicator 77, it may happen that it springs or gives rearwardly, so that the reversal operation may not be effected or the carriage step may not be performed. In the third construction, the order indicator 77 is not braced, and yet a perfectly reliable reversal of the controlling members is obtained.

An angular member 185 (Fig. 30) is secured on the bearing bracket 155 (Figs. 29 and 30) by screws 155s and is transversely slotted at 187 to form a passageway for the lug 94 and the extension 88 (Fig. 29) of the flap 84 to the inverted V-shaped cam 74 of the catch 150. The portion 186 of the member 185 is positioned above the cam 74 of the catch 150 for preventing inadvertent reversal of the members of the complementary totalizer 2. For instance, it may happen that when the paper carriage is at the right-hand end of its movement, and the operator inserts a form in the paper carriage, he accidentally depresses the cam 74 so that the catch 150 is thrown out and the controlling members are reversed, resulting in a miscalculation. This is prevented by the member 186 which only admits the lug 94 and the extension 88 through its slot 187. If, by any circumstance, for instance, by an unauthorized person attempting to tamper with the machine, the catch 150 is thrown out and the controlling members are reversed, the roller 44 of the reversing lever 13 rises on the incline 49a (Fig. 29) of the bracket 46 during tabulation, to return the members to their normal positions.

*The arrangement of the parts of a modified tensioning member for the controlling members of the complementary totalizer, fourth construction, Figs. 31 to 34*

The modification of the tensioning member for the controlling members of the column totalizer 2, as illustrated in Figs. 31 to 34, will now be described.

The retaining plate 194 is secured to the inner side of the vertical portion of the casing 51. Three screws 191 extend at right angles to the front of the machine through holes 192 (Fig. 34) in the casing 51 and their rear ends are inserted in threaded holes 193 in the retaining plate 194. A fourth screw 191 (Figs. 31 and 33) extends in parallel relation to the front of the machine through a hole in the side of the casing 51. Its rear end engages in a threaded hole 193 in a flange 201 (Fig. 34) at the right-hand end of the plate 194 and the screw is surrounded by a distance sleeve 192a between the flange 201 of the plate 194 and the portion 190a of the casing 51 (Figs. 31 and 33). An extension 195 of the plate 194 projects upwardly through a slot 196 in the casing 51 and is equipped with a pin 197 on which the roller 198 is mounted to rotate. During the carriage return, the roller 198 rolls on the rib 199 at the front plate 200 of each totalizer and prevents rising thereof. The flange 201 at the right-hand end of the retaining plate 194 extends toward the rear and with its lower end 202 supports a spring-suspension eye 203 in which is inserted the right-hand end of a spring, 204. The left-hand end of the spring 204 is attached to a bolt 205 in a downwardly extending part 206 of a pivoted restoring member 207. A bearing boss 208 on the restoring member 207 is mounted to turn on a bearing screw 211 which is inserted in a hole 209 in the casing 51 and with its rear end engages in a threaded hole 210 of the retaining plate 194. The spring 204 tends to turn the pivoted restoring member 207 anti-clockwise, and this movement is limited by the lower end of a slot 212 in the member 207 bearing against a headed screw 213 (Fig. 31) which extends through a hole 214 in the casing 51 and with its rear end engages in a threaded hole 215 in the retaining plate 194. The right-hand end 216 of the tensioning member 207 extends upwardly in oblique direction and is offset rearwardly to extend into the path of the roller 44 on the reversing lever 13 of the complementary totalizer 2 (Fig. 32). A tensioning arm 218 (Figs. 31 to 33) is mounted to swing about a bearing screw 217 on the front side of the auxiliary casing 71 (Figs. 31 and 33). A distance sleeve 219 (Fig. 32) on the bearing screw holds the tensioning arm at the proper distance from the casing 71 so that a cam 220 at the upper end of the restoring member 207 is in the path of the tensioning arm 218. A pin 221 is riveted into the arm 218 to which a spring 222 is attached. The spring 222 is anchored on a pin 223 secured in the casing 71 and permanently turns the tensioning arm 218 clockwise about its bearing screw 217, the normal position of the arm being defined by a pin 224 riveted into the casing 71.

*The operation of the tensioning means for the controlling members of the complementary totalizer according to the construction illustrated in Figs. 31 to 34*

Let it be assumed that the accounting operation in the first line of the form F (Fig. 15) has been completed, that is, that the value "115.15" has been typed and that in consequence the controlling members of the complementary totalizer 2 are in the positions shown in Fig. 28. When now the carriage return is positively effected, the lower end of the tensioning arm 218 (Fig. 33) acts on the incline 220a of the cam 220, swinging the restoring member 207 clockwise about its bearing screw 211 and into the position shown in Fig. 33, and putting tension on the spring 204. During the farther movement of the paper carriage to the right, the lower end of the tensioning arm 218 slides on the horizontal upper edge 220b of the cam 220, holding the restoring member 207 in its depressed position (Fig. 33). When the tensioning arm 218 has cleared the upper edge 220b of the cam, the restoring member 207, under the action of the tensioned spring 204, swings back into its initial position according to Fig. 31 about the bearing screw 211, and the upper edge 216a (Fig. 34) of its cam portion 216 acts on the roller 44 of the reversing lever 13 to return the controlling members of the complementary totalizer 2 into the normal positions illustrated in Figs. 27 and 29 from the positions according to Fig. 28. In consequence of the abrupt swinging up of the restoring member 207 a complete return of the controlling members of the complementary totalizer 2 can be relied on. As mentioned, the roller 198 of the retaining plate 194 rolls on the rib 199 of the front plate 200 of the complementary totalizer and this prevents rising of the complementary totalizer 2.

An incline 225 (Figs. 34 and 33) is provided at the right of the rearwardly offset portion 216 of the restoring member 207. The object of this incline is to throw the controlling members of the complementary totalizer 2 back into their normal positions if the operator, with the paper carriage in its final position at the right of the machine, knocks inadvertently against the inverted V-shaped cam 74 (Fig. 29) of the catch 150, so that the controlling members are moved from their initial positions as shown in Figs. 27 and 29, into the reversed position shown in Fig. 28. In this case, when the paper carriage is tabulated, the roller 44 of the reversing lever 13 rises on the incline 225 of the cam on the restoring member 207 and the controlling members of the complementary totalizer 2 are positively returned into their initial positions (Fig. 27), the spring 204 being so strong as to prevent swinging of the restoring member 207 during this operation.

When, during the tabulation of the paper carriage in letter spacing direction, the tensioning arm 218 strikes the cam 220 of the restoring member 207, the arm yields anticlockwise against the action of its spring 222 so that the restoring member 207 is not swung.

*General description of the modified constructions illustrated in Figs. 35 to 43*

In order to promote a quick understanding of the object for which the fifth to seventh constructions are provided, a short reference to the operation of the first construction, as illustrated in Figs. 1 to 13, and explained with reference to Figs. 15 to 26, is required. This will be explained for the calculating example $$\begin{array}{r} 0\ 000\ 000.00 \\ -9\ 999\ 999.99 \\ \hline -\qquad 1 \end{array}$$

In the right-hand final position of the paper carriage of the typewriting-calculating machine which is the initial position for accounting work, the control-selecting lever 102 which supports the screens 112 and 113 (Fig. 35) has been moved into the position illustrated in Figs. 35 and 36 by the head 99 of the stud 97 of the driving wheel 96 for the highest calculating order in the complementary totalizer 2, as described in the section entitled "The operation of the complementary totalizer and the parts of the mechanism cooperating with it" for the first construction illustrated in Figs. 1 to 13. In this position, the screen 112 exposes the set of negative numeral wheels 116—which indicates "zero" in this case and the screen 113 conceals the set of positive numeral wheels 115 (Figs. 36 and 44), which in this case indicate "9." In conformity with the example, let it be assumed that the value "9 999 999.99" is to be entered subtractively in the complementary totalizer which, by way of example, has ten orders or denominations. The numeral wheels in both sets 115 and 116 are rotated nine units or steps in the direction of the arrow in Fig. 44B, so that the set of negative numeral wheels 116 indicates the value "99999999 99" while the set of positive numeral wheels 115—which is concealed by the screen 113—shows the value "00000000 00." The stud 97 with its head 99, on the driving wheel 96 of the highest calculating order—which wheel rotates clockwise, has advanced along the arcuate edge 100 of the arm 101 of the control-selecting lever 102 and has occupied the position shown in Fig. 44B.

For the next accounting operation, let it be assumed, by way of example, that the value "1" is also to be entered subtractively in the complementary totalizer 2. The numeral wheels at the lowest calculating order of both sets 115 and 116 of numeral wheels are rotated farther for one unit in the direction of the arrows in Fig. 44B, and at the moment the numeral wheel of the lowest calculating order in the set of negative numeral wheels 116 is turned from "9" to "0," a tens transfer occurs which progresses from calculating order to calculating order. At the moment the numeral wheel at the highest calculating order in the set of negative numeral wheels 116 is about to move from "9" to "0," that is, when the capacity of the complementary totalizer 2 is overstepped or exceeded, the stud 97, 99 of the driving wheel 96 at the highest calculating order—which rotates clockwise—strikes the lower or front end B of the arcuate slot 98 in the left-hand side plate 39 (Fig. 44C) of the column totalizer 2, arresting the rotation of this driving wheel 96 at the highest calculating order. This positive arresting of the driving wheel 96 would cause damage to the mechanisms of the totalizer and to the calculating mechanism concealed by the casing 51 and result in miscalculations.

To avoid accidents of this kind, the following arrangements have been made according to the invention.

*Description of the members in the fifth construction, as shown in Figs. 35 to 38*

A cross rod 230 is screwed into the right-hand side plate 3 (Figs. 36 and 37) of the complementary totalizer 2 at one end. Its other end extends through a circular hole 235 in the left-hand side plate 39 of the complementary totalizer 2 and is supported by a bearing bracket 232 in which a hole 231 (Fig. 37) is made for its reception. The bearing bracket 232 has a circular recess 234 in its inner face and is secured to the left-hand side plate 39 of the complementary totalizer 2 by screws 233. The driving wheels for the several calculating orders, including the driving wheel 96 for the highest order in the complementary totalizer 2, are mounted to rotate on the cross rod 230. The head 99 of the stud 97 is free to rotate in the recess 234 in the bearing bracket 232 and in the hole 235 in the left-hand side plate 39 of the complementary totalizer 2, so that the driving wheel 96 can perform a full revolution without obstruction.

The head 99 of the stud 97 operates the screens 112 and 113 which alternately conceal the set of positive numeral wheels 115 and the set of negative numeral wheels 116 (Fig. 36) of the complementary totalizer 2 through the control-selecting lever 102. This lever, and the members cooperating with it, have been fully described for the first construction according to Figs. 1 to 13 in the said section entitled "The operation of the complementary totalizer and the parts of the machine cooperating with it," and need not be described again here.

*The overstepping of the capacity of the complementary totalizer when calculating "minus" values*

As mentioned, in the initial position of the complementary totalizer 2 for accounting operations, the driving wheel 96, its stud 97, 99, the control-selecting lever 102, and its screens 112 and 113 occupy the initial positions illustrated in Figs. 35 and 36 in which the set of negative numeral wheels 116 indicates "zero" and the control-selecting lever 102 which carries the screens 112 and 113 has been so controlled by the head 99 of the stud 97 that the screen 112 exposes the set of negative numeral wheels 116 and the screen 112 conceals the set of positive numeral wheels 115 which in this case is at "9" (Figs. 35 and 36).

If, by way of example, several "minus" values are subtracted during a given accounting operation whose total is indicated by the set of negative numeral wheels 116, and if such values are entered up to the highest calculating order, the driving wheel 96 is rotated clockwise. The head 99 of its stud 97 slides along the arcuate edge 100 of the arm 101 of the control-selecting lever 102, holding the lever in the position illustrated in Fig. 35. The operative connection 99, 100 is maintained as far as the "9" position of the driving wheel 96, that is, until so many digits have been entered into the highest calculating place, that its numeral wheel 116 indicates "9."

If during the subsequent operations of an accounting problem still more "minus" values are introduced for calculation, and if this oversteps the capacity of the complementary totalizer 2, the driving wheel 96 at the highest calculating order is rotated farther in clockwise direction, to the zero position, or even beyond. Due to the excess travel of the wheel of highest order beyond its capacity, the head 99 of the stud 97 releases the edge 100 of the arm 101 on the control-selecting lever 102 so that the lever can swing clockwise about its bearing screw 103, to set the screen 112 so that it conceals the set of negative numeral wheels 116 and setting the screen 112 so that it exposes the set of positive numeral wheels, 115. This reversal of the screens indicates to the operator that he has overstepped the capacity of the complementary totalizer 2.

In this construction, as distinguished from the first construction, Figs. 1 to 13, the driving wheel 96 at the highest calculating order in the complementary totalizer 2 can rotate clockwise beyond a zero position and perform a complete revolution, without obstruction, due to the circular hole 235 in the side plate 39 at the left of the complementary totalizer 2 and in this manner damage to the mechanisms of the totalizers and to the calculating mechanism of the machine covered by the casing 51 is avoided when the capacity is overstepped.

*The overstepping of the capacity of the complementary totalizer when calculating "plus" values*

Assume that all members of the complementary totalizer are in their normal positions according to Fig. 35, that is, the complementary totalizer 2 has been "clear" written.

If several "plus" values are added during an accounting operation, the total of these values will be indicated by the set of positive numeral wheels 115.

In this case, in the first construction according to Figs. 1 to 13, and in the manner described in the section entitled "The arrangement of the screen-controlling mechanism of the complementary totalizer" due to the shift of the control-selecting lever 102 and its screens 112 and 113 from the positions shown in Fig. 35 into the positions shown in Fig. 38, the set of positive numeral wheels 115 is exposed, and the set of negative numeral wheels 116 is concealed.

If the operator calculates with repeated additions of "plus" values up to the highest calculating order, and the driving wheel 96 of that order is rotated anti-clockwise, and if he oversteps the capacity of the complementary totalizer 2, the stud 97, with its head 99, moves counter-clockwise in the rear portion of the hole 235 in the left hand side plate 39 of the complementary totalizer 2 without interfering with any other parts, and so damage to mechanisms is avoided also in this case when the capacity of the complementary totalizer 2 is overstepped.

*Description of the sixth construction, as shown in Figs. 39 and 40*

In this construction, the control-selecting lever 102 (Figs. 39 and 40) in addition to the other parts described in the section entitled "Description of the members in the fifth construction, as shown in Figs 35 to 38" is equipped with a fifth arm 102a which, with the arm 101, forms an arcuate fork and the spring 104 is dispensed with.

In the normal position of the parts of the complementary totalizer 2, the controlling members occupy the normal positions illustrated in Fig. 39. The operation of the control-selecting lever 102 when calculating "minus" values is similar to that described in the section entitled "The overstepping of the capacity of the complementary totalizer when calculating 'minus' values."

When "plus" values are calculated, the driving wheel 96 at the highest calculating order is rotated into the position shown in Fig. 40 from the position shown in Fig. 39. The head 99 of its stud 97 clears the edge 100 of the arm 101 and engages the inner edge 102b of the arm 102a, whereby the initiating lever 102 is turned clockwise about its bearing screw 103, and into the position Fig. 40. When more "plus" values are added as far as the highest calculating order, and the driving wheel 96 of that order is rotated anti-clockwise, the head 99 of the stud 97 on the wheel 96 slides along the edge 102b of the fifth arm 102a, holding the control-selecting lever 102 in the position shown in Fig. 40.

As will appear from the above, the lever 102 which supports the screens 112 and 113 is positively shifted in either direction by the head 99 of the stud 97 when calculating "plus" and "minus" values in the construction according to Figs. 39 and 40, and the spring 104 is not required.

*Description of the members of the seventh construction, as shown in Figs. 41 to 43*

In Figs. 41 to 43, a further construction of the means for controlling the screens 112 and 113 is illustrated whose arrangement will be described in the following:

Arranged on the left-hand side of the driving wheel 96 of the highest calculating order, is a face cam 236 (Figs. 41 to 43). A cam groove 237 is made in the face cam 236. A pin 238 engages in the cam groove 237 which has two concentric portions of different radii, and an ascending portion 239 and a descending portion 240 connecting the concentric portions. The pin 238 extends inwardly through a slot 241 in the left-hand side plate 39 of the complementary totalizer 2 and is secured in a link 242. At its lower end, the link 242 has a fork 243 which engages the shank of a headed screw 244 on the outer face of the side plate 39 by which the lower end of the link is guided.

At the upper end of the link 242, a rivet 245 is arranged by which the link is pivoted on a U-shaped portion of the arm 109 of the screen-supporting control-selecting lever 102 which has but three arms in this instance. Preferably, a lug 246 is formed on the rearwardly extending arm 123 of the lever 102 in which an arcuate slot 247 is formed. A guiding screw 248 which is screwed into the left-hand side plate 39 of the complementary totalizer 2, engages in the slot 247 and serves as an additional guide for the lever 102.

*The normal position of the controlling members when entering "minus" values*

In the normal position, that is, when "minus" values are entered, the driving wheel 96 at the highest calculating order occupies the position shown in Fig. 41, if the corresponding negative numeral wheel 116 shows "zero." In this normal position, the pin 238 of the link 242 is in that portion of the cam groove 237 which has the larger radius. The link 242 and the lever 102 to which it is pivoted at 245, together with the screens 112 and 113, occupy their topmost positions (Fig. 41) in which the set of negative numeral wheels 116 is exposed by the screen 112.

When entering "minus" values up to the highest calculating order, the driving wheel 96 at the highest calculating order of the complementary totalizer 2 is rotated clockwise and the large-radius portion of the cam groove 237 moves past the pin 238. If during these calculating operations the capacity of the complementary totalizer 2 is overstepped, the ascending portion 239 of the cam groove 237 reaches the pin 238 and moves the link 242 down at the moment the numeral wheel 116 at the highest calculating order moves from "9" to "0" until the pin 238 slides into the small-radius portion of the cam groove 237. The control-selecting lever 102 is swung clockwise about its bearing screw 103, the screen 113 exposing the set of positive wheels 115 and the screen 112 concealing the set of negative numeral wheels 116. This indicates to the operator that the capacity of the column totalizer 2 has been overstepped.

*The position of the controlling members when entering "plus" values*

When entering "plus" values, first the driving wheel 96 at the highest calculating order in the complementary totalizer 2 is turned through one unit anti-clockwise from the position shown in Fig. 41 to that in Fig. 42. During this anti-clockwise movement of the driving wheel 96 the descending portion 240 of the cam groove 237 in the face cam 236 on the side of the driving wheel 96 acts on the pin 238 and moves the link 242 down (Fig. 42). By the rivet 245 the link 242 swings the initiating lever 102 clockwise. The screen 112 of the control-selecting lever 102 now conceals the set of negative numeral wheels 116—which had been exposed—and exposes the set of positive numeral wheels 115 which had been concealed. When adding positive values up to the highest calculating order, if the capacity is overstepped, the small-radius portion of the cam groove 237 moves past the pin 238 without influencing it in any way.

The following arrangement has been provided for indicating to the operator, before he begins an accounting operation that the complementary totalizer 2 is ready for operation, that is, is in its initial condition in which the set of negative numeral wheels 116 is at "zero," the screen 112 exposing this set, and the screen 113 concealing the set 115, as shown in Figs. 35, 36 and 39.

*Description of the "ready" indicator in the complementary totalizer*

A cross rod 250 (Figs. 35, 37 and 38) is secured in side plates 3 and 39 of the complementary totalizer 2, and an indicator arm 251 is mounted to swing about, and to slide on, the cross rod 250 near the inner side of the left-hand side plate 39 (Fig. 36). A cam tooth 252 on the lower side of the arm 251 is arranged for cooperation with the stud 97 of the driving wheel 96 at the highest calculating order. The front end 253 of the indicator arm 251 is bent to the right and a plate 254 at the free end of the bent portion bears a mark 255, preferably in white. In the initial position of the indicator arm 251 (Fig. 35) the stud 97 on the driving wheel 96 engages the cam tooth 252 on the arm and holds the indicator arm in elevated position in which its mark 255 is visible through an inspection hole 257 in the front plate 256 of the complementary totalizer 2 (Fig. 36), indicating to the operator that the complementary totalizer 2 is ready for operation. When the driving wheel 96 at the highest calculating order is rotated, the stud 97 of the wheel releases the cam tooth 252 on the indicator arm 251, and the arm swings clockwise about the cross rod 250 by gravity, until a lug 258 at its lower side is arrested by a stop 259 riveted into the left-hand side plate 39 of the complementary totalizer 2 (Fig. 38). The mark 255 on its plate 254 is now concealed by the solid portion of the front plate 256 below the hole 257.

*The position of the "ready" indicator if the complementary totalizer is not in the proper initial condition*

If, due to any cause, for instance, through inadvertence of the operator at the beginning of an accounting operation, the controlling members of the complementary totalizer 2 have been so operated that the "fugitive 1" has been added to the set of positive numeral wheels 115, the parts 96, 97-99, and 102, occupy the position illustrated in Fig. 38.

In this position, the stud 97 of the driving wheel 96 at the highest calculating order in the complementary totalizer 2 has released the cam tooth 252 on the indicator arm 251 which now, by gravity, swings clockwise about its cross rod 250 until the lower end of its lug 258 is arrested by the stop pin 259. The mark 255 is now below the inspection hole 257 in the front plate 256 (Fig. 38) and is not visible to the operator. This indicates that the complementary totalizer 2 is not in the proper initial position for operation. The proper positioning of the members in the complementary totalizer 2 is effected positively by the movement of the paper carriage of the typewriting calculating machine.

The "ready" indicator according to the invention which has just been described prevents wrong accounting by the operator.

*The capacity-overstepping indicator*

Fig. 45 shows an indicator by which the operator is advised that the capacity of the complementary totalizer 2 has been overstepped, and whether the calculation is positive or negative.

An indicator arm 261 is mounted to swing about a screw 260 in the left-hand side plate 39 of the complementary totalizer 2. At its free end, the arm is equipped with a sector bearing the marks "1P," "0P," "1N," and "0N" which can be observed through an inspection hole 264 in the front plate 256 of the complementary totalizer 2. A spring 266 tends to pull the arm 261 against a stop 272 in the side plate 39. At its rear end, the arm 261 is equipped with a fork-shaped member the arcuate inner edges of the respective arms of the forked member being formed on respectively different diameters 263 and 267. Two opposed cams 270 and 270a are suspended within the area enclosed by the arcuate arms of the fork-shaped member and arranged substantially concentrically to the respective arms. Each cam 270, 270a is secured to the free end of its individual U-shaped bracket 269, 269a, the other ends of the brackets being secured to the respective arms of the fork.

A pin 262 on the head 99 of the stud 97 on the driving wheel 96 at the highest calculating order in the complementary totalizer 2 controls the indicator arm 261.

In the proper initial condition of the complementary totalizer 2 in which the screen 112 exposes the set of negative numeral wheels 116 and the set of positive numeral wheels 115 is concealed by the screen 113 (Fig. 35), as shown in Figs. 35 and 36, the driving wheel 96 of the highest calculating order occupies the position illustrated in Fig. 45 in which the pin 262 of the stud 97, 99 acts on the step 263 of the indicator arm 261 and holds the arm in the position illustrated in Fig. 45. In this position of the arm, the mark "ON" is visible in the inspection hole 264, indicating that no capacity has yet been overstepped, and the calculation is negative. While "minus" values are calculated, the arm 261 remains in this position until the numeral wheel which is allotted to the highest calculating order in the set of negative numeral wheels 116, shows "9". In this "9" position, the stud 97, 99 is in the position D shown in dotted lines in Fig. 45. If more "minus" values are entered and the capacity of the complementary totalizer 2 is overstepped, the driving wheel 96 at the highest calculating order rotates farther into the zero position, or beyond, in the direction of the arrow. Now the indicating arm 261 under the action of the spring 266 rocks clockwise until the step 265 of the cam 270a abuts on the pin 262 of the stud 97, 99 of the wheel 96. The mark "IN" is now in line with the inspection hole 264, indicating to the operator that he has overstepped the capacity one time in the negative sense.

Assuming that the parts of the complementary totalizer 2 (Fig. 45) are in their initial positions, and that positive values are to be entered, the driving wheel 96 of the highest calculating order is rotated against the arrow and the pin 262 on the stud 97 releases the step 263 of the indicator arm 261 whereupon the spring 266 swings the indicator arm 261 clockwise, until its step 267 is arrested by the pin 262. When more positive values are entered into the highest calculating order so that the driving wheel 96 rotates farther contra to the direction of the arrow, the pin 262 slides along the edge 268 of the suspended cam 270 which is connected to the arm 261 by the U-shaped bracket 269 until it arrives in the position E shown in dotted lines and corresponding to the "9" position of the numeral wheel in the highest calculating position of the set of negative numeral wheels 116.

During the travel of the pin 262 along the arcuate edge or step 267, the indicator arm 261 occupies that position in which the mark "OP" is visible through the inspection hole 264. The operator is thus advised that the calculation is positive, but that the capacity of the complementary totalizer has not been overstepped.

If subsequently more positive values are entered into the complementary totalizer 2, and the capacity of the totalizer is overstepped, the driving wheel 96 at the highest calculating order is rotated farther to the zero position or beyond against the arrow. When the numeral wheel moves from "9" to "0," the pin 262 leaves the edge 268 of the cam 270 and the spring 266 swings the arm 261 clockwise until the reduced edge 271 of the cam bears against the pin 262. In this position the indicator arm 261 is arrested by the stop pin 272 and the mark "IP" becomes visible in the inspection hole 264 advising the operator that he has overstepped the capacity one time in the positive sense.

Having now particularly described and ascertained the nature of my invention, and in what manner the same is to be performed, I declare that what I claim is:

1. In a typewriting-accounting machine, the combination with a carriage shiftable in letter-spacing direction and return; a totalizer mounted to travel with the carriage, and including a series of denominational wheels; and a master actuator engageable with the wheels successively to turn the wheels differentially in either direction; of an operating mechanism to turn the wheel of lowest denomination one step; relatively independently operable control devices, one of which is effective upon said operating mechanism to cause it to turn the wheel of lowest denomination during carriage movement after the disconnection of the totalizer wheel of lowest order and the master actuator, the other of said control devices being effective upon said operating mechanism to turn the wheel of lowest denomination prior to the engagement of the wheel of highest denomination with the master actuator; and control selecting means settable under control of the wheel of highest denomination, to one or another of its positions according to whether the amount registered on the totalizer is positive or negative, to select which of the control devices shall be effective.

2. In a typewriting-accounting machine, the combination with a carriage shiftable in letter-spacing direction and return; a totalizer mounted to travel with the carriage, and including a series of denominational wheels; and a master actuator engageable with the wheels successively to turn the wheels differentially in either direction; of an operating mechanism traveling with the carriage, to turn the wheel of lowest denomination one step; relatively independently operable control devices past which the totalizer travels, one of which control devices is effective upon said operating mechanism incident to the relative movement between the operating mechanism and such control devices, to cause it to turn the wheel of lowest denomination during carriage movement after the disconnection of the totalizer wheel of lowest order and the master actuator, the other of said control devices being effective upon said operating mechanism to turn the wheel of lowest denomination prior to the engagement of the wheel of highest denomination with the master actuator; said last-named control device being shiftable into and out of its effective position; a control selecting means settable to one or another of its positions; and means under control of the totalizer to set the control selecting means according to whether the amount registered on the totalizer is positive or negative, said setting means effective to displace the shiftable control device when the total is negative and to retain the shiftable control selecting means in such ineffective position until the operating mechanism escapes past the control device.

3. In a typewriting-accounting machine, the combination with a carriage shiftable in letter-spacing direction and return; a totalizer mounted to travel with the carriage, and including a set of denominational wheels; and a master actuator engageable with the wheels successively to turn the wheels differentially in either direction; of an operating mechanism travelling with the carriage and capable of turning the wheel of lowest denomination one step, the operating mechanism having a wiping contact face; relatively independent control devices, either of which may be engaged by the wiping contact face during carriage travel, to actuate the operating mechanism, to cause it to turn the wheel of lowest order in one direction, one only of said control devices being shiftable into and out of the path of the wiping contact face; control selecting means settable to one or another of its positions accordingly as the amount registered on the totalizer is positive or negative to determine whether or not the shiftable control device shall remain in the path of the wiping contact face; and means to restore the operating mechanism to its initial position, and thereby impart one step of movement in the opposite direction to the wheel of lowest denomination.

4. In a typewriting-accounting machine, the combination with a carriage shiftable in letter-spacing direction and return; a totalizer mounted to travel with the carriage, and including a set of denominational wheels; and a master actuator engageable with the wheels successively to turn the wheels differentially in either direction; of an operating mechanism travelling with the carriage and capable of turning the wheel of lowest denomination one step; a plurality of selective control devices, either of which may actuate the operating mechanism during carriage travel, to cause the mechanism to turn the wheel of lowest denomination one step in one direction, one only of said control devices being shiftable into and out of the path of the operating mechanism; control selecting means settable to one or another of its positions accordingly as the amount on the totalizer is positive or negative to determine the position of the shiftable control device; and means also operable during carriage travel to restore the operating mechanism to its initial position and thereby impart one step of movement in the opposite direction to the wheel of lowest denomination.

5. In a typewriting-accounting machine, the combination with a carriage shiftable in letter-spacing direction and return; a totalizer mounted to travel with the carriage, and including a set of denominational wheels; and a master actuator engageable with the wheels successively to turn the wheels differentially in either direction; of additional actuating means traveling with the totalizer and shiftable out of and back to normal position, said additional actuating means capable of turning the wheel of lowest denomination one step; operating members connected with said additional actuating means, one of which operating members is effective to cause said additional actuating means to turn the wheel in one direction, and the other operating member is effective to cause the additional actuating means to turn the wheel in the opposite direction to supply a fugitive one; a plurality of control devices relatively to which the carriage travels, and operable upon one of said operating members at different times during carriage travel and incident thereto, to actuate said additional wheel-turning means, one only of said control devices being shiftable into and out of effective position with respect to its operating member; means settable by the totalizer accordingly as the amount on the totalizer is positive or negative to displace or to escape the shiftable control device incident to travel of the carriage in one direction past said shiftable control device to select which control device shall be effective; and a further control device to co-act with the remaining operating member during carriage travel to return said additional actuating means to its normal position, whereby the wheel of lowest denomination is given a step of movement in the opposite direction.

6. In a typewriting-accounting machine, the combination with a carriage shiftable in letter-spacing direction and return; a totalizer mounted to travel with the carriage, and including a set of denominational wheels; and a master actuator engageable with the wheels successively to turn the wheels differentially in either direction; of a normally idle additional operating mechanism to turn the wheel of lowest denomination one step; means co-acting with the additional operating mechanism to effect the actuation thereof out of its normal position during carriage travel in one direction, to turn the wheel of lowest denomination in one direction; a resetting lever connected with said operating mechanism; and a cam member located in the path of the resetting lever and effective to operate the resetting lever during travel of the carriage in either direction, to restore said additional operating mechanism to its normal position and cause it to impart a step of movement to the wheel of lowest denomination in the opposite direction.

7. In a typewriting-accounting machine, the combination with a carriage shiftable in letter-spacing direction and return; a totalizer mounted to travel with the carriage, and including a set of denominational wheels; and a master actuator engageable with the wheels successively to turn the wheels differentially in either direction; of an additional operating mechanism, to turn the wheel of lowest denomination one step; control means with which said operating mechanism co-acts during carriage travel, to turn the wheel of lowest denomination one step in one direction; a normally idle resetting lever connected with said operating mechanism, and rocked to effective position coincident with the actuation of said operating mechanism under the influence of said control means; and an additional control means to co-act with the resetting member when in its effective position, to restore the resetting member and said operating mechanism to their initial positions and thereby effect a step of travel of the wheel of lowest denomination in the opposite direction.

8. In a typewriting-accounting machine, the combination with a carriage shiftable in letter-spacing direction and return; a totalizer mounted to travel with the carriage and including a series of denominational wheels; and a master actuator engageable with the wheels successively to turn the wheels differentially; of a normally idle operating mechanism to turn the wheel of lowest denomination one step, and including a wheel-actuating member, a normally locked spring means to drive the wheel-actuating member, and a trip lever to releasably retain the spring driving means in cocked position; a control device engaged by the trip lever during carriage travel, to disengage the trip lever and release the cocked driving means for operation, to enter a fugitive one in additive direction into the wheel of lowest denomination; and means relatively to which the carriage travels to restore the operating mechanism to its normal position incident to the carriage travel.

9. In a typewriting-accounting machine, the combination with a carriage shiftable in letter-spacing direction and return; a totalizer mounted to travel with the carriage, and including a series of denominational wheels; and a master actuator engageable with successive wheels to turn them differentially; of a spring-driven mechanism to turn the wheel of lowest order one step; a trip means to normally hold the spring-driven mechanism in cocked position; a control device with which the trip means co-acts during carriage travel, to release the cocked mechanism for operation; and resetting means operable upon the spring-driven mechanism during carriage travel, to recock the spring-driven mechanism.

10. In a typewriting-accounting machine, the combination with a carriage shiftable in letter-spacing direction and return; a totalizer mounted to travel with the carriage, and including a series of denominational wheels; and a master actuator engageable with the wheels successively to rotate them differentially; of means to rotate the wheel of lowest order one step; a spring-actuated driving means for the wheel-rotating means; a releasable means to lock the driving means in cocked position; a shiftable control device and a stationary control device, either of which may trip the releasable locking means during carriage travel in one direction; and a control selecting means settable by the totalizer train of highest order to one or another of its positions according to whether the amount on the totalizer wheels is positive or negative, to determine which of the control devices shall be effective to trip the locking means.

11. In a typewriting-accounting machine, the combination with a carriage shiftable in letter-spacing direction and return; a totalizer mounted to travel with the carriage, and including a series of denominational wheels; and a master actuator engageable with the wheels successively to rotate them differentially; of entering means to rotate the wheel of lowest order one step; a spring-actuated driving means for the wheel-rotating means; a releasable means to lock the driving means in cocked position; a shiftable control device and a stationary control device; either of which may trip the releasable locking means during carriage travel in one direction; a control selecting means settable by the totalizer train of highest order to one or another of its positions according to whether the amount on the totalizer wheels is positive or negative, to determine which of the control devices shall be effective to trip the locking means; and resetting means to restore the entering means to initial position and the driving means to cocked position during travel of the carriage in the opposite direction.

12. In a typewriting-accounting machine, the combination with a carriage shiftable in letter-spacing direction and return; a totalizer mounted to travel with the carriage, and including a series of denominational wheels; and a master actuator engageable with the wheels successively to rotate them differentially; of normally idle entering means to rotate the wheel of lowest order one step in one direction; a spring-actuated driving means for the wheel-rotating means; a releasable means to lock the driving means in cocked position; a shiftable control device and a stationary control device, either of which may trip the releasable locking means during carriage travel in one direction; a control selecting means settable by the totalizer train of highest order to one or another of its positions according to whether the amount on the totalizer wheels is positive or negative, to determine which of the control devices shall be effective to trip the locking means; and a second spring-actuated means to restore the entering means to its initial position and the driving means to cocked position during travel of the carriage in the opposite direction, whereby to rotate the wheel of lowest denomination one step in the opposite direction.

13. In a typewriting-accounting machine, the combination with a carriage shiftable in letter-spacing direction and return; a totalizer mounted to travel with the carriage, and including a series of denominational wheels; and a master actuator engageable with the wheels successively to rotate them differentially; of entering means to rotate the wheel of lowest order one step in one direction; a spring-actuated driving means for the wheel-rotating means; a releasable means to lock the driving means in cocked position; a shiftable control device and a stationary control device, either of which may trip the releasable locking means during carriage travel in one direction; a control selecting means settable by the totalizer train of highest order to one or another of its positions according to whether the amount on the totalizer wheels is positive or negative, to determine which of the control devices shall be effective to trip the locking means; and stationary means engageable by the spring-actuated drive means incident to travel of the carriage in the opposite direction to restore the spring-actuated drive means and the entering means to their normal positions, whereby to rotate the wheel of lowest denomination one step in the opposite direction, and to enable the releasable locking means to become effective to latch the driving and entering means, respectively, in their normal positions.

14. In a typewriting-accounting machine, the combination with a carriage shiftable in letter-spacing direction and return, a totalizer mounted to travel with the carriage, and including a series of denominational wheels; and a master actuator engageable with the wheels successively to rotate them differentially; of entering means to rotate the wheel of lowest order one step in one direction; a spring-actuated driving means for the wheel-rotating means; a releasable means to lock the driving means in cocked position; a shiftable control device and a stationary control device, either of which may trip the releasable locking means during carriage travel in one direction; a control selecting means settable by the totalizer train of highest order to one or another of its positions according to whether the amount on the totalizer wheels is positive or negative, to determine which of the control devices shall be effective to trip the locking means; a second spring-actuated means, including a normally ineffective cam; and a by-pass element mounted to travel with the carriage, and effective, on the carriage return travel, to tension said second spring-actuated means and then release it, whereby said second spring-actuated means operates to restore the entering means to its initial position, and the first-named driving means to its cocked position, whereby to again rotate the wheel of lowest denomination in the opposite direction.

15. In a typewriting-accounting machine, the combination with a carriage shiftable in letter-spacing direction and return; a totalizer mounted to travel with the carriage, and including a set of denominational wheels; and a master actuator to drive the wheels in either direction denomination by denomination; of means supplementary to the master actuator to turn the units denominational wheels one step; a plurality of control devices, one only of which is shiftable relatively to the other into and out of effective position relatively to the supplementary means and when shifted out of effective position, to unmask the other of said control devices for effective operation of the supplementary actuating means, said control device located in the path of the supplementary means to become effective prior to the arrival of the totalizer in its calculating position; and control selecting means shiftable to one or another of its positions according to whether the registered total is positive or negative, to determine which of the control devices shall be effective in relation to the supplemental means.

16. In a typewriting-accounting machine, the combination with a carriage shiftable in letter-spacing direction and return; a totalizer mounted to travel with the carriage, and including a set of denominational wheels; and a master actuator to drive the wheels in either direction denomination by denomination; of means supplementary to the master actuator to turn the units denominational wheels one step; a plurality of control devices effective during carriage travel in letter-spacing direction, to actuate the supplementary actuating means; means settable to one or another of its positions according to whether the registered total is positive or negative to select which of two control devices shall be effective; and a third control device effective upon the supplementary actuating means during carriage travel in the opposite direction, to reset the supplementary actuating means and turn the units denominational wheels backwardly one unit.

17. In a typewriting-accounting machine, the combination with a carriage shiftable in letter-spacing direction and return; a totalizer mounted to travel with the carriage, and including a set of denominational wheels; and a master actuator engageable with the wheels successively to turn the wheels differentially in either direction; of means supplementary to the master actuator, to turn the wheel of units denomination one step, including a trip member; a plurality of control devices, either of which may be effective on the trip member to initiate movement of the wheel of units denomination in one direction only; and control device selecting means settable to one or another of its positions according to whether the registered total is positive or negative, to determine which of the control devices shall be effective.

18. In a typewriting-accounting machine, the combination with a carriage shiftable in letter-spacing direction and return; a totalizer mounted to travel with the carriage, and including a set of denominational wheels; and a master actuator engageable with the wheels successively to turn the wheels differentially in either direction; of means supplementary to the master actuator, to turn the wheel of units denomination one step, including a trip member; a plurality of control devices, either of which may be effective on the trip member; control selecting means settable to one or another of its positions according to whether the registered total is positive or negative, to determine which of two control devices shall be effective; a restoring means for the supplementary actuating means; and an additional control device effective with relation to the restoring member to reset the supplementary actuating means and turn the units wheel one step in the reverse direction.

19. In a typewriting-accounting machine, the combination with a carriage shiftable in letter-spacing direction and return; a totalizer mounted to travel with the carriage, and including a set of denominational wheels; and a master actuator engageable with the wheels successively to turn the wheels differentially in either direction; of means supplementary to the master actuator, to turn the wheel of units denomination one step, including a trip member; a plurality of control devices, any of which may be effective on the trip member, one only of the control devices being shiftable into and out of effective position relatively to the trip member; and control selecting means settable to one or another of its positions according to whether the registered total is positive or negative, and in one of which positions it displaces the shiftable control device relatively to the trip member.

20. In a typewriting-accounting machine, the combination with a carriage shiftable in letter-spacing direction and return; a totalizer mounted to travel with the carriage, and including a set of denominational wheels; and a master actuator engageable with the wheels successively to turn the wheels differentially in either direction; of means supplementary to the master actuator, to turn the wheel of units denomination one step, including a trip member; a plurality of control devices, either of which may be effective on the trip member; control selecting means settable to one or another of its positions according to whether the registered total is positive or negative, to determine which of two control devices shall be effective; means to releasably hold the supplementary actuating means in either its normal or its operated position; a restoring means for the supplementary actuating means; and an additional control device effective with relation to the restoring means to reset the supplementary actuating means, and turn the units wheel one step in the reverse direction.

21. In a typewriting-accounting machine, the combination with a carriage shiftable in letter-spacing direction and return; a totalizer mounted to travel with the carriage, and including a set of denominational wheels; and a master actuator engageable with the wheels successively, to turn the wheels differentially in either direction; of normally idle means supplementary to the master actuator to turn the units denominational wheel one step; a plurality of relatively independent control devices, any of which may be effective on the supplementary actuating means; control selecting means settable to one or another of its positions according to whether the amount registered on the totalizer wheels is positive or negative, to determine which of the said control devices shall be effective to control the shift of the supplementary actuating means to its operated position; means to latch the supplementary actuating means in either its normal or in its operated positions; and resetting means relatively to which the carriage travels to restore the supplementary actuating means to its normal position incident to return carriage travel.

22. In a typewriting-accounting machine, the combination with a carriage shiftable in letter-spacing direction and return; a totalizer mounted to travel with the carriage, and including a series of denominational wheels; and a master actuator engageable with successive wheels to turn the wheels differentially; of supplementary means to turn the wheel of lowest denomination one step in one direction or the other, including an oscillatory member; a plurality of operating elements therefor, one of which imparts motion in additive direction to the oscillatory element, and the other of which imparts motion in subtractive direction to said element; at least three control devices including a control device shiftable into and out of effective position, each individually capable of actuating the respective operating elements with which they are associated, during carriage travel, the shiftable control device and one of the remaining control devices being arranged in spaced relation to actuate the additive one of said operating elements at respectively different positions of the carriage and totalizer during carriage travel in letter spacing direction; a control selecting means settable to one or another of its positions according to whether the amount on the totalizer is positive or negative, to determine whether the shiftable control device shall be effective or ineffective; the remaining one of the control devices effective upon the subtractive operating element during return travel of the carriage.

23. In a typewriting-accounting machine, the combination with a carriage shiftable in letter-spacing direction and return; a totalizer mounted to travel with the carriage, and including a set of denominational wheels; and a master actuator engageable with the denominational totalizer wheels successively, to differentially turn the wheels additively or subtractively; of normally idle means supplementary to the master actuator to always turn the units denominational wheel a step of movement in one direction upon carriage travel in letter-spacing direction, and to turn the units denominational wheel one step in the opposite direction on carriage return travel; means operative incident to travel of the carriage, to cause an actuation of the supplementary means during letter-spacing travel of the carriage; a restoring element connected with the supplementary means; and means to operate the restoring element incident to return carriage travel to cause the supplementary means to turn the units denominational wheel one step in the opposite direction.

24. In a typewriting-accounting machine, the combination with a carriage shiftable in letter-spacing direction and return; a totalizer mounted to travel with the carriage, and including a set of denominational wheels; and a master actuator engageable with the denominational totalizer wheels successively, to differentially turn the wheels additively or subtractively; of means supplementary to the master actuator to turn the units denominational wheel a step of movement in one direction upon carriage travel in letter-spacing direction, and to turn the units denominational wheel one step in the opposite direction on carriage return travel; means tripped during letter spacing travel of the carriage, and operative upon said supplementary means to cause an actuation thereof; a restoring element connected with the supplementary means; means to operate the restoring element incident to return carriage travel; and a state controlled device mounted on the totalizer, and shiftable into and out of effective position by the totalizer, to determine whether the supplementary means shall be conditioned for operation prior to or subsequently to engagement of the totalizer and the master wheel.

25. In a typewriting-accounting machine, the combination with a carriage shiftable in letter-spacing direction and return; a totalizer mounted to travel with the carriage, and including a set of denominational wheels; and a master actuator engageable with the wheels successively, to turn the wheels differentially in either direction: of a normally idle entering means traveling with the totalizer and shiftable out of and into its normal position, said entering means capable of turning the totalizer wheel of lowest denomination one step in either direction; operating members connected with said entering means, said operating members respectively effective to cause the entering means to turn said lowest totalizer wheel in one direction, or the other; a plurality of control devices relatively to which the carriage travels, and operable upon one of said operating members at different times during such carriage travel and incident thereto, to actuate said entering means, said control devices being arranged in tandem relatively to the operating member with which they co-act, one of said control devices being shiftable into and out of effective position relatively to its operating member; means settable by the totalizer accordingly as the amount on the totalizer is positive or negative, to displace or to escape the shiftable control device incident to travel of the carriage in one direction past said shiftable control device, to select which control device shall be effective; and a further control device to co-act with the remaining operating member during carriage travel, to return the entering means to its normal position, and turn the totalizer wheel of lowest denomination in the opposite direction.

26. In a typewriting-accounting machine, the combination with a carriage shiftable in letter spacing direction and return; a totalizer mounted to travel with the carriage, and including a set of denominational wheels; and a master actuator with which the denominational wheels successively engage, to be turned differentially in either direction by the master wheel; of additional means to turn the wheel of units denomination, a trip member to control actuation of said additional means; a plurality of control devices, any of which may be effective on the trip member to initiate movement of the wheel of units denomination in one direction only; the control devices operable upon the trip member at respectively different positions in the travel of the totalizer relatively to its master actuator; and control selecting means settable to one or another of its positions according to whether the registered total is positive or negative, to determine which of the control devices shall become effective.

HUGO ERNST KÄMMEL.